US009625737B2

(12) United States Patent
Moriya et al.

(10) Patent No.: US 9,625,737 B2
(45) Date of Patent: Apr. 18, 2017

(54) LENS DRIVE APPARATUS, CAMERA MODULE AND CAMERA

(71) Applicants: Akihiro Moriya, Tokyo (JP); Masayoshi Sugawara, Tokyo (JP)

(72) Inventors: Akihiro Moriya, Tokyo (JP); Masayoshi Sugawara, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 0 days.

(21) Appl. No.: 15/141,899

(22) Filed: Apr. 29, 2016

(65) Prior Publication Data
US 2016/0241788 A1  Aug. 18, 2016

Related U.S. Application Data

(63) Continuation of application No. 14/664,174, filed on Mar. 20, 2015, which is a continuation of application
(Continued)

(30) Foreign Application Priority Data

Aug. 21, 2009 (JP) .................................. 2009-191619
Jul. 13, 2010 (JP) .................................. 2010-158602

(51) Int. Cl.
*H04N 5/232* (2006.01)
*G02B 27/64* (2006.01)
(Continued)

(52) U.S. Cl.
CPC ............ *G02B 27/646* (2013.01); *G02B 7/08* (2013.01); *G02B 7/09* (2013.01); *G02B 13/001* (2013.01);
(Continued)

(58) Field of Classification Search
CPC ........... H04N 5/23248; H04N 5/23264; H04N 5/2328
(Continued)

(56) References Cited

U.S. PATENT DOCUMENTS 5,717,960 A    2/1998  Tomita et al.
7,161,621 B2 *  1/2007  Kai ........................ G03B 17/48
                                                          250/239
(Continued)

FOREIGN PATENT DOCUMENTS

CN        1912668 A       2/2007
CN      101154013 A       4/2008
(Continued)

OTHER PUBLICATIONS

Office Action for U.S. Appl. No. 14/663,666 dated Sep. 9, 2015.
(Continued)

*Primary Examiner* — Anthony J Daniels
(74) *Attorney, Agent, or Firm* — Brundidge & Stanger, P.C.

(57) ABSTRACT

A lens drive apparatus that displaces a lens holder in a direction of an optical axis and a direction orthogonal to the optical axis comprises: an assembly formed by assembling the lens holder together with a conductive body and comprises a circuit that receives supplied power; a shake correction drive section configured to displace the assembly by a shake correction magnet and a shake correction coil disposed at a position facing the shake correction magnet in collaboration with each other; and a position detection section configured to detect a position of the assembly in the direction orthogonal to the optical axis, wherein: the shake correction magnet is disposed around the lens holder, and the shake correction magnet, the shake correction coil and the position detection section are disposed at respective posi-
(Continued)

tions shifted in the direction of the optical axis with respect to each other.

8 Claims, 17 Drawing Sheets

Related U.S. Application Data

No. 13/390,603, filed as application No. PCT/JP2010/063683 on Aug. 12, 2010, now Pat. No. 9,013,588.

(51) Int. Cl.

| | |
|---|---|
| *G03B 3/10* | (2006.01) |
| *G03B 5/00* | (2006.01) |
| *H04N 5/225* | (2006.01) |
| *G02B 7/09* | (2006.01) |
| *G03B 13/36* | (2006.01) |
| *H04N 5/335* | (2011.01) |
| *G02B 7/08* | (2006.01) |
| *G03B 3/00* | (2006.01) |
| *G03B 17/02* | (2006.01) |
| *G03B 17/00* | (2006.01) |
| *G02B 13/00* | (2006.01) |

(52) U.S. Cl.
CPC ............... *G03B 3/00* (2013.01); *G03B 3/10* (2013.01); *G03B 5/00* (2013.01); *G03B 13/36* (2013.01); *G03B 17/00* (2013.01); *G03B 17/02* (2013.01); *H04N 5/2253* (2013.01); *H04N 5/2254* (2013.01); *H04N 5/2257* (2013.01); *H04N 5/23248* (2013.01); *H04N 5/23264* (2013.01); *H04N 5/23287* (2013.01); *H04N 5/335* (2013.01); *G03B 2205/0015* (2013.01); *G03B 2205/0069* (2013.01)

(58) Field of Classification Search
USPC .................................................... 348/208.99
See application file for complete search history.

(56) References Cited

U.S. PATENT DOCUMENTS

| | | | |
|---|---|---|---|
| 7,649,703 B2 | 1/2010 | Shiraki et al. | |
| 8,279,289 B2 | 10/2012 | Nagata et al. | |
| 2001/0028516 A1* | 10/2001 | Noguchi | G02B 27/646 |
| | | | 359/823 |
| 2002/0163589 A1 | 11/2002 | Yukawa et al. | |
| 2002/0176713 A1 | 11/2002 | Kai | |
| 2003/0090816 A1 | 5/2003 | Nakamura et al. | |
| 2004/0136704 A1 | 7/2004 | Usui | |
| 2004/0168178 A1 | 8/2004 | Yang | |
| 2005/0076353 A1 | 4/2005 | Nakamura et al. | |
| 2006/0034599 A1 | 2/2006 | Osaka | |
| 2006/0285840 A1 | 12/2006 | Takahashi | |
| 2007/0009244 A1 | 1/2007 | Takahashi | |
| 2007/0035860 A1 | 2/2007 | Adachi et al. | |
| 2007/0086770 A1 | 4/2007 | Okita et al. | |
| 2007/0109412 A1 | 5/2007 | Hara | |
| 2007/0127904 A1 | 6/2007 | Iwasaki et al. | |
| 2007/0154198 A1 | 7/2007 | Oh et al. | |
| 2007/0188620 A1 | 8/2007 | Takahashi | |
| 2007/0236577 A1 | 10/2007 | Ke et al. | |
| 2007/0292119 A1 | 12/2007 | Lee | |
| 2008/0031103 A1* | 2/2008 | Horinouchi | G11B 7/0932 |
| | | | 369/44.37 |
| 2008/0068489 A1 | 3/2008 | Watanabe et al. | |
| 2008/0079813 A1 | 4/2008 | Suzuki | |
| 2008/0111890 A1 | 5/2008 | Inaba | |
| 2009/0009742 A1 | 1/2009 | Arai | |
| 2009/0027506 A1 | 1/2009 | Kobayashi et al. | |
| 2009/0027507 A1 | 1/2009 | Kobayashi et al. | |
| 2009/0067827 A1 | 3/2009 | Yoshida et al. | |
| 2009/0073585 A1 | 3/2009 | Yamashita | |
| 2009/0185796 A1 | 7/2009 | Tsutsumi et al. | |
| 2010/0033616 A1* | 2/2010 | Huang | G02B 7/021 |
| | | | 348/335 |
| 2010/0079604 A1 | 4/2010 | Washisu | |
| 2010/0080545 A1* | 4/2010 | Fan | G03B 5/02 |
| | | | 396/55 |
| 2010/0150545 A1 | 6/2010 | Imai et al. | |
| 2011/0096178 A1 | 4/2011 | Ryu et al. | |
| 2011/0097062 A1 | 4/2011 | Tsuruta et al. | |
| 2011/0122495 A1 | 5/2011 | Togashi | |

FOREIGN PATENT DOCUMENTS

| | | |
|---|---|---|
| EP | 1672774 A2 | 6/2006 |
| EP | 1855145 A1 | 11/2007 |
| EP | 1906233 A1 | 4/2008 |
| JP | 56-137532 A | 10/1981 |
| JP | 58-137140 A | 8/1983 |
| JP | S61-258345 A | 11/1986 |
| JP | H02-98828 A | 4/1990 |
| JP | 06-068841 B2 | 8/1994 |
| JP | 7-14268 B2 | 2/1995 |
| JP | 09-069231 A | 3/1997 |
| JP | 9-73111 A | 3/1997 |
| JP | H10-090587 A | 4/1998 |
| JP | 11-064905 A | 3/1999 |
| JP | 2001-110075 A | 4/2001 |
| JP | 2001-290184 A | 10/2001 |
| JP | 2001-297460 A | 10/2001 |
| JP | 2003-151156 A | 5/2003 |
| JP | 2003-172961 A | 6/2003 |
| JP | 2004-274242 A | 9/2004 |
| JP | 2005-250284 A | 9/2005 |
| JP | 2006-065352 A | 3/2006 |
| JP | 2006-171062 A | 6/2006 |
| JP | 2006-215095 A | 8/2006 |
| JP | 2007-017874 A | 1/2007 |
| JP | 2007-017957 A | 1/2007 |
| JP | 2007-041418 A | 2/2007 |
| JP | 2007-041455 A | 2/2007 |
| JP | 2007-068273 A1 | 3/2007 |
| JP | 2007-093953 A | 4/2007 |
| JP | 2007-108596 A | 4/2007 |
| JP | 2007-121695 A | 5/2007 |
| JP | 2007-139810 A | 6/2007 |
| JP | 2007-142938 A | 6/2007 |
| JP | 2007-156062 A | 6/2007 |
| JP | 2007-183488 A | 7/2007 |
| JP | 2007-212876 A | 8/2007 |
| JP | 2007-293125 A | 11/2007 |
| JP | 2008-015159 A | 1/2008 |
| JP | 2008-020668 A | 1/2008 |
| JP | 2008-026634 A | 2/2008 |
| JP | 2008-052196 A | 3/2008 |
| JP | 2008-065221 A | 3/2008 |
| JP | 2008-089800 A | 4/2008 |
| JP | 2008-111867 A | 5/2008 |
| JP | 2008-112200 A | 5/2008 |
| JP | 2008-170838 A | 7/2008 |
| JP | 2008-203451 A | 9/2008 |
| JP | 2008-233298 A | 10/2008 |
| JP | 2009-009027 A | 1/2009 |
| JP | 2009-80217 A | 4/2009 |
| JP | 2009-109583 A | 5/2009 |
| JP | 2009-145771 A | 7/2009 |
| JP | 2009-145852 A | 7/2009 |
| JP | 2009-163089 A | 7/2009 |
| JP | 2009-271204 A | 11/2009 |
| JP | 2009-288770 A | 12/2009 |
| JP | 2010-085471 A | 4/2010 |
| JP | 2011-118032 A | 6/2011 |
| JP | 2011-521285 A | 7/2011 |
| WO | 2006/046350 A1 | 5/2006 |
| WO | 2008/029671 A1 | 3/2008 |
| WO | 2008/139964 A1 | 11/2008 |
| WO | 2009/133691 A1 | 11/2009 |
| WO | 2009/139543 A1 | 11/2009 |

(56) References Cited

FOREIGN PATENT DOCUMENTS

OTHER PUBLICATIONS

Office Action for U.S. Appl. No. 14/663,705 dated Sep. 9, 2015.
Office Action for U.S. Appl. No. 14/663,686 dated Sep. 16, 2015.
Office Action for U.S. Appl. No. 14/663,720 dated Sep. 23, 2015.
Office Action for U.S. Appl. No. 14/663,710 dated Sep. 23, 2015.
Office Action for U.S. Appl. No. 14/663,733 dated Oct. 6, 2015.
Extended European Search Report for EP 151684032 dated Oct. 9, 2015.
Extended European Search Report for EP 15168405.7 dated Oct. 9, 2015.
Extended European Search Report for EP 15168396.8 dated Oct. 14, 2015.
Office Action for U.S. Appl. No. 14/663,744 dated Oct. 15, 2015.
Office Action for U.S. Appl. No. 14/664,151 dated Nov. 3, 2015.
Office Action for U.S. Appl. No. 14/664,165 dated Nov. 4, 2015.
Extended European Search Report for EP 15168407.3 dated Nov. 13, 2015.
Extended European Search Report for EP 15168427.1 dated Nov. 17, 2015.
Office Action for U.S. Appl. No. 14/664,192 dated Nov. 19, 2015.
Office Action for U.S. Appl. No. 14/663,750 dated Dec. 10, 2015.
Office Action for U.S. Appl. No. 14/664,188 dated Dec. 10, 2015.
Office Action for EP12157959.3 dated Feb. 18, 2016.
Extended European Search Report for EP 15168391.9 dated Feb. 26, 2016.
Extended European Search Report for EP 15168440.4 dated Feb. 29, 2016.
Office Action for U.S. Appl. No. 14/664,198 dated Apr. 20, 2016.

* cited by examiner

LENS DRIVE APPARATUS, CAMERA MODULE AND CAMERA

CROSS-REFERENCE TO THE RELATED APPLICATION

The present application is a Continuation Application of application Ser. No. 14/664,174, filed Mar. 20, 2015, which is a Continuation Application of application Ser. No. 13/390,603, filed Feb. 15, 2012, now U.S. Pat. No. 9,013,588, which claims priority from PCT/JP2010/063683, filed Aug. 12, 2010, the contents of which are incorporated herein by reference.

TECHNICAL FIELD

The present invention relates to a camera-shake correction apparatus, and more particularly to a camera-shake correction apparatus that corrects camera shake (vibration) that occurs when a still image is captured with a small camera for mobile phone use, and enables a blur-free image to be captured.

BACKGROUND OF THE INVENTION

Various camera-shake correction apparatuses (image blurring correction apparatuses) have hitherto been proposed that enable blurring on an imaging surface to be prevented and sharp imaging to be achieved despite the occurrence of camera shake (vibration) when a still image is captured.

Optical methods such as a sensor shifting method and lens shifting method, and software methods in which camera shake is corrected by image processing by means of software, are known as camera-shake correction methods.

A sensor shifting method is disclosed in Patent 2004-274242 (Patent Literature 1), for example. A digital camera disclosed in Patent Literature 1 has a configuration in which an imaging device (CCD) is movable centered on a reference position (center) by means of an actuator. The actuator performs camera-shake correction by moving a CCD according to camera shake detected by a vibration sensor. The CCD is located in a CCD moving section. The CCD can be moved by means of the CCD moving section within an XY plane perpendicular to a Z axis. The CCD moving section comprises three main members: a base plate fixed to a housing, a first slider that moves in the X-axis direction with respect to the base plate, and a second slider that moves in the Y-axis direction with respect to the base plate.

In a sensor shifting method such as disclosed in Patent Literature 1, the CCD moving section (movable mechanism) is large. Consequently, it is difficult to apply a sensor-shifting type of camera-shake correction apparatus to a small camera for mobile phone use from a size (external shape and height) standpoint.

Next, lens shifting methods will be described.

Patent 2009-145771 (Patent Literature 2), for example, discloses a camera-shake correction apparatus that includes a camera-shake correction unit that drives a corrective lens. The camera-shake correction unit is provided with a base plate, which is a fixed member, a movable lens barrel that holds the corrective lens in a movable fashion, three spheres held between the base plate and the movable lens barrel, a plurality of elastic bodies supporting the movable lens barrel elastically against the base plate, two coils fixed to the base plate, and two magnets fixed to the movable lens barrel.

Also, Patent 2006-65352 (Patent Literature 3) discloses an "image blurring correction apparatus" that corrects image blurring by controlling the movement of a specific lens group (hereinafter referred to as "corrective lens") in an imaging optical system (image formation optical system) comprising a plurality of lens groups in two directions perpendicular to each other in a plane perpendicular to the optical axis. In the image blurring correction apparatus disclosed in Patent Literature 3, the corrective lens is supported so as to be able to move vertically (in the pitch direction) and laterally (in the yaw direction) with respect to a fixed frame via a pitching movement frame and yawing movement frame.

Patent 2008-26634 (Patent Literature 4) discloses a "camera-shake correction unit" that includes a corrective optical member that corrects blurring of an image formed by an imaging optical system by moving in a direction that intersects the optical axis of the imaging optical system. In the case of a corrective optical member disclosed in Patent Literature 4, a lens holding frame that holds a corrective lens is supported so as to be able to move in the pitch direction and yaw direction with respect to a housing barrel via a pitch slider and yaw slider.

Patent 2006-215095 (Patent Literature 5) discloses an "image blurring correction apparatus" that can move a corrective lens by means of a small driving force. and can perform fast and high-precision image blurring correction. The image blurring correction apparatus disclosed in Patent Literature 5 is provided with a holding frame that holds a corrective lens, a first slider that supports this holding frame so as to be able to slide in a first direction (pitch direction), a second slider that supports the holding frame so as to be able to slide in a second direction (yaw direction), a first coil motor that drives the first slider in the first direction, and a second coil motor that drives the second slider in the second direction.

Patent 2008-15159 (Patent Literature 6) discloses a lens barrel provided with a camera-shake correction optical system installed so as to be able to move in a direction perpendicular to the optical axis. In the camera-shake correction optical system disclosed in Patent Literature 6, a movable VR unit located inside a VR body unit holds a corrective lens (a third lens group), and is installed so as to be able to move within an XY plane perpendicular to the optical axis.

Patent 2007-212876 (Patent Literature 7) discloses an "image blurring correction apparatus" in which image blurring can be corrected by making a corrective lens held in a movable frame movable in mutually perpendicular first and second directions with respect to the optical axis of the lens system, and controlling the optical axis of the corrective lens by means of a drive section so as to coincide with the optical axis of the lens system.

Patent 2007-17957 (Patent Literature 8) discloses an "image blurring correction apparatus" that corrects image blurring by driving a corrective lens for correcting blurring of an image formed by a lens system by means of operation of a lens drive section in a first direction and second direction that are directions perpendicular to the optical axis of the lens system and also mutually perpendicular. In the image blurring correction apparatus disclosed in Patent Literature 8, the lens drive section is provided located toward a direction perpendicular to the optical axis of the corrective lens.

Patent 2007-17874 (Patent Literature 9) discloses an "image blurring correction apparatus" in which image blurring can be corrected by making a corrective lens held in a movable frame movable in a first direction and second direction that are directions perpendicular to the optical axis of the lens system and also mutually perpendicular, and controlling the optical axis of the corrective lens so as to coincide with the optical axis of the lens system. This image blurring correction apparatus disclosed in Patent Literature 9 is provided with a drive section having a coil and magnet that are made movable in a relative fashion. Either the coil or the magnet is fixed to a movable frame, and the other is fixed to a supporting frame that supports the movable frame in a movable fashion. Also, this image blurring correction apparatus disclosed in Patent Literature 9 is provided with a first Hall device that detects position information relating to a first direction of the corrective lens by detecting magnetic force of the magnet, and a second Hall device that detects position information relating to a second direction of the corrective lens by detecting magnetic force of the magnet.

The lens-shifting types of image blurring correction apparatuses (camera-shake correction apparatuses) disclosed in above Patent Literature 2 through 9 all have a structure whereby a corrective lens is adjusted by being moved in a plane perpendicular to the optical axis. Therefore, a problem with an image blurring correction apparatus (camera-shake correction apparatus) having such a structure is that its structure is complex and it is not suitable for miniaturization. That is to say, as with an above-described sensor-shifting type of camera-shake correction apparatus, it is difficult to apply a lens-shifting type of camera-shake correction apparatus to a small camera for mobile phone use from a size (external shape and height) standpoint.

A software method is disclosed, for example, in Patent HEI11-64905 (Patent Literature 10). In the method disclosed in Patent Literature 10, a captured image is made static when an imaging apparatus becomes static and free from camera shake by eliminating a noise component from detection section detection results, and calculating specific information necessary for correction of image blurring due to shaking of the imaging apparatus from a detection signal from which this noise component has been eliminated.

However, a problem with this software method disclosed in Patent Literature 10 is that image quality degrades in comparison with an above-described optical method. Also, a software method has the disadvantage of taking a long time, since it includes both imaging time and software processing time.

In order to solve the above problems, a camera-shake correction apparatus (image blurring correction apparatus) has been proposed that corrects camera shake (image blurring) by shaking an actual lens module (camera module) that holds a lens and imaging device (image sensor). Such a method will be referred to here as an "optical unit tilting method."

"Optical unit tilting methods" will now be described.

Patent 2007-41455 (Patent Literature 11), for example, discloses an "optical apparatus image blurring correction apparatus" that is provided with a lens module that holds a lens and imaging device, a frame structure that supports this lens module so as to be rotatable by means of a rotation shaft, a drive section (actuator) that rotates the lens module with respect to the frame structure by providing driving force to a driven section (rotor) of the rotation shaft, and a force application section (leaf spring) that forces the drive section (actuator) against the driven section (rotor) of the rotation shaft. The frame structure comprises an inner frame and outer frame. The drive section (actuator) is disposed so as to come into contact with the driven section (rotor) of the rotation shaft from a direction perpendicular to the optical axis. The drive section (actuator) comprises a piezoelectric device and a rotation-shaft-side operating section. The operating section drives the rotation shaft by means of vertical oscillation and flexion oscillation of the piezoelectric device.

Also, Patent 2007-93953 (Patent Literature 12) discloses a "camera-shake correction apparatus" in which a camera module integrating an imaging lens and image sensor is housed in a housing, and the camera module is pivoted in the housing so as to be able to rock freely about a first shaft and second shaft that are perpendicular to the imaging optical axis and intersect each other at right angles, and camera shake during still image capture is corrected by controlling the overall attitude of the camera module within the housing according to shaking of the housing detected by a camera-shake sensor. The camera-shake correction apparatus disclosed in Patent Literature 12 is provided with a center frame that supports the inner frame to which the camera module is fixed so as to be able to rock freely about the first shaft from the outside thereof, an outer frame that is fixed to the housing and supports the center frame so as to be able to rock about the second shaft from the outside thereof, a first drive section that is incorporated into the center frame and rocks the inner frame about the first shaft according to a camera-shake signal from a camera-shake sensor (first sensor module that detects camera shake in the pitch direction), and a second drive section that is incorporated into the outer frame and rocks the center frame about the second shaft according to a camera-shake signal from a camera-shake sensor (second sensor module that detects camera shake in the yaw direction). The first drive section comprises a first stepping motor, a first reduction gear train that decelerates the rotation thereof, and a first cam that rotates integrally with a final gear and rocks the inner frame via a first cam follower provided on the inner frame. The second drive section comprises a second stepping motor, a second reduction gear train that decelerates the rotation thereof, and a second cam that rotates integrally with a final gear and rocks the center frame via a second cam follower provided on the center frame.

Furthermore, Patent 2009-288770 (Patent Literature 13) discloses an "imaging optical apparatus" capable of dependably correcting shaking by improving the configuration of an imaging unit drive mechanism for shake correction for the imaging unit. The imaging optical apparatus disclosed in Patent Literature 13 comprises, on the inside of a fixed cover, an imaging unit (movable module), and a shake correction mechanism for performing shake correction by displacing this imaging unit. The imaging unit is for moving a lens in the optical axis direction. The imaging unit comprises a movable body that holds a lens and fixed diaphragm on the inside, a lens drive mechanism that moves this movable body in the optical axis direction, and a support on which the lens drive mechanism and movable body are mounted. The lens drive mechanism is provided with a lens drive coil, lens drive magnet, and yoke. The imaging unit is supported by a fixed body by means of four suspension wires. At two places on either side of the optical axis are provided a first imaging unit drive mechanism and second imaging unit drive mechanism for shake correction, the two of which form a pair. In these imaging unit drive mechanisms, an imaging unit drive magnet is held on the movable body side, and an imaging unit drive coil is held on the fixed body side.

Patent 2007-142938 (Patent Literature 14) discloses a portable information terminal having a function for correcting camera shake during imaging using a gyroscope or suchlike angular velocity sensor. In order to perform correction of captured image shake, it is necessary to set a reference pitch axis and yaw axis that are mutually perpendicular in a plane that is perpendicular to the optical axis of a camera lens, and detect the angular velocity of both rotation with the pitch axis as the central axis of rotation and rotation with the yaw axis as the central axis of rotation. Patent Literature 14 discloses the disposition of a first gyroscope that detects the rotational angular velocity of rotation about the pitch axis, and a second gyroscope that detects the rotational angular velocity of rotation about the yaw axis, on a side surface of an imaging apparatus.

Also, Patent 2008-20668 (Patent Literature 15) discloses a lens drive apparatus that drives a lens in the optical axis direction. This lens drive apparatus disclosed in Patent Literature 15 is provided with a plurality of coiled bodies fixed to the outer periphery of a lens support, and a magnet section disposed facing the coiled bodies. The magnet section is provided with magnetic poles N and S that are polarized into an N pole and S pole in a radial direction and differ in the lens optical axis direction. The coiled bodies are provided corresponding to the polarity of the magnet section, and currents flow in mutually opposite directions in adjacent coiled bodies.

CITATION LIST

Patent Literature

PTL 1
Patent 2004-274242
PTL 2
Patent 2009-145771
PTL 3
Patent 2006-65352
PTL 4
Patent 2008-26634
PTL 5
Patent 2006-215095
PTL 6
Patent 2008-15159
PTL 7
Patent 2007-212876
PTL 8
Patent 2007-17957
PTL 9
Patent 2007-17874
PTL 10
Patent HEI11-64905
PTL 11
Patent 2007-41455
PTL 12
Patent 2007-93953
PTL 13 12
Patent 2009-288770 (FIG. 1 through FIG. 5)
PTL 14
Patent 2007-142938 (Paragraph 0005, Paragraph 0006, FIG. 2)
PTL 15
Patent 2008-20668

SUMMARY OF INVENTION

Technical Problem

The "sensor-shifting" camera-shake correction apparatus disclosed in above Patent Literature 1 has a large CCD moving section (movable mechanism), and is therefore difficult to apply to a small camera for mobile phone use from a size (external shape and height) standpoint.

On the other hand, the "lens-shifting" image blurring correction apparatuses (camera-shake correction apparatuses) disclosed in above Patent Literature 2 through 9 all have a structure whereby a corrective lens is adjusted by being moved in a plane perpendicular to the optical axis, and there is therefore a problem in that their structure is complex and is not suitable for miniaturization.

The "software-type" camera-shake correction method disclosed in Patent Literature 10 has a problem of image quality degrading in comparison with an optical type, and also has the disadvantage of taking a long time, since it includes both imaging time and software processing time.

On the other hand, the "optical-unit-tilting" image blurring correction apparatus disclosed in Patent Literature 11 requires the lens module to be covered with a frame structure comprising an inner frame and outer frame. Also, the "optical-unit-tilting" image blurring correction apparatus disclosed in Patent Literature 12 requires the camera module to be covered with an inner frame, center frame, and outer frame. As a result, the camera-shake correction apparatus is large in size. Furthermore, with an "optical unit tilting method," there is a rotation shaft, and there is consequently also a problem of the occurrence of friction between a hole and shaft, and the occurrence of hysteresis. The "optical-unit-tilting" imaging optical apparatus disclosed in Patent Literature 13 requires a magnet for imaging unit drive in addition to a magnet for lens drive. As a result, there is a problem of the imaging optical apparatus being large in size.

The portable information terminal disclosed in Patent Literature 14 only discloses the use of an angular velocity sensor such as a gyroscope as a camera-shake sensor.

Also, Patent Literature 15 simply discloses a lens drive apparatus that drives a lens in the optical axis direction.

Therefore, the technical problem to be solved by the present invention is to provide a small, low-profile camera-shake correction apparatus.

Other objects of the present invention will become clear as the description proceeds.

Solution to Problem

To state the main point of a typical aspect of the present invention, a camera-shake correction apparatus corrects camera shake by moving all or a moving part of an auto-focusing lens drive apparatus for moving a lens barrel along the optical axis, in a first direction and a second direction that are perpendicular to the optical axis and are perpendicular to each other. The auto-focusing lens drive apparatus is provided with a focusing coil and a permanent magnet that is disposed on the radial-direction outside of this focusing coil with respect to the optical axis and facing the focusing coil. According to a typical aspect of the present invention, a camera-shake correction apparatus has: a base that is disposed so as to be spaced from the bottom surface of the auto-focusing lens drive apparatus; a plurality of suspension wires that each have one end fixed to the outer peripheral section of this base, that extend along the optical axis, and that support the entire auto-focusing lens drive apparatus or a moving part thereof so as to be able to rock in the first direction and the second direction; and a camera-shake correction coil disposed so as to face the permanent magnet.

DESCRIPTION OF EMBODIMENTS

Now, embodiments of the present invention will be described with reference to the accompanying drawings.

Figure 1:
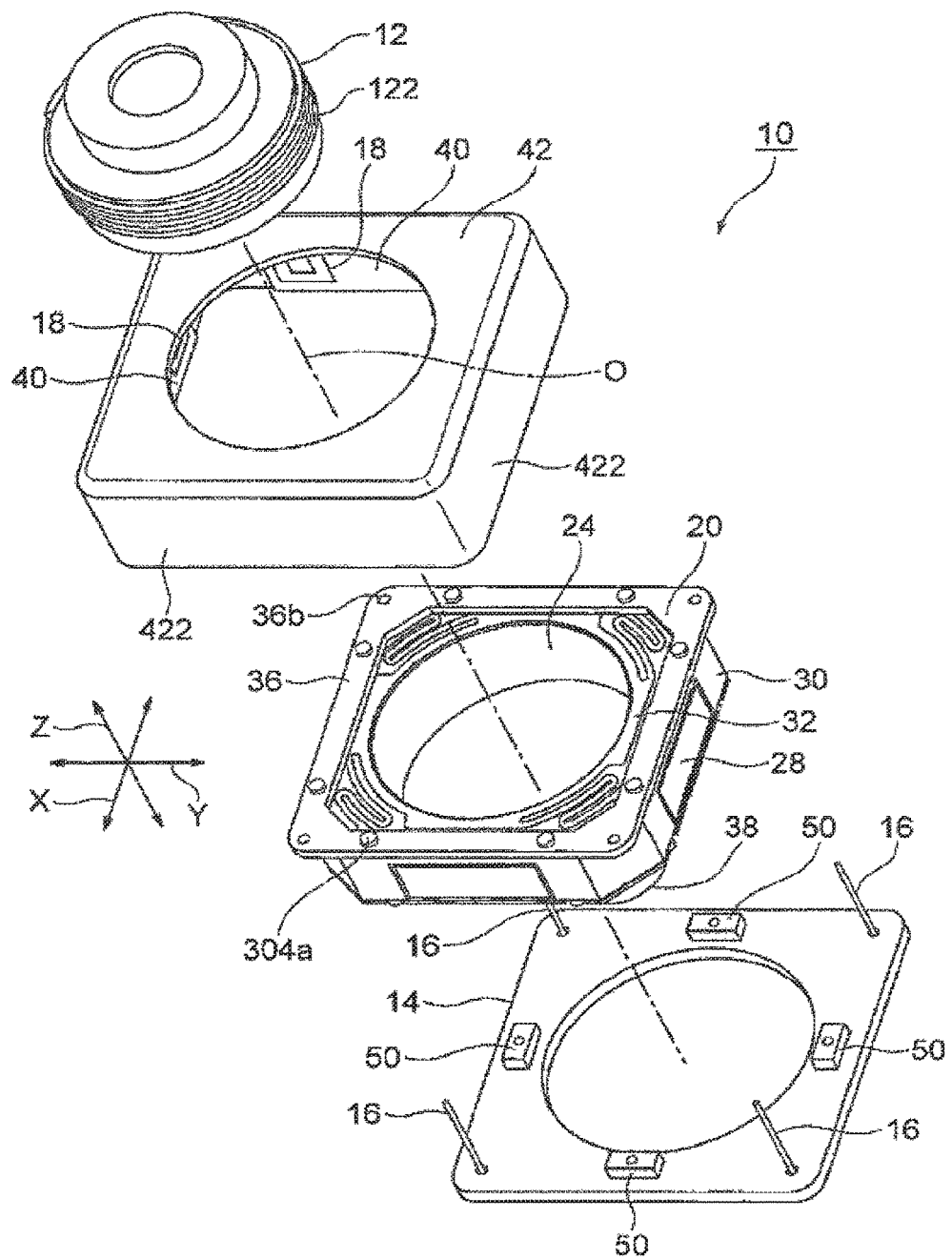
FIG. 1 is an exploded oblique view of a camera-shake correction apparatus according to a first embodiment of the present invention.
Figure 2:
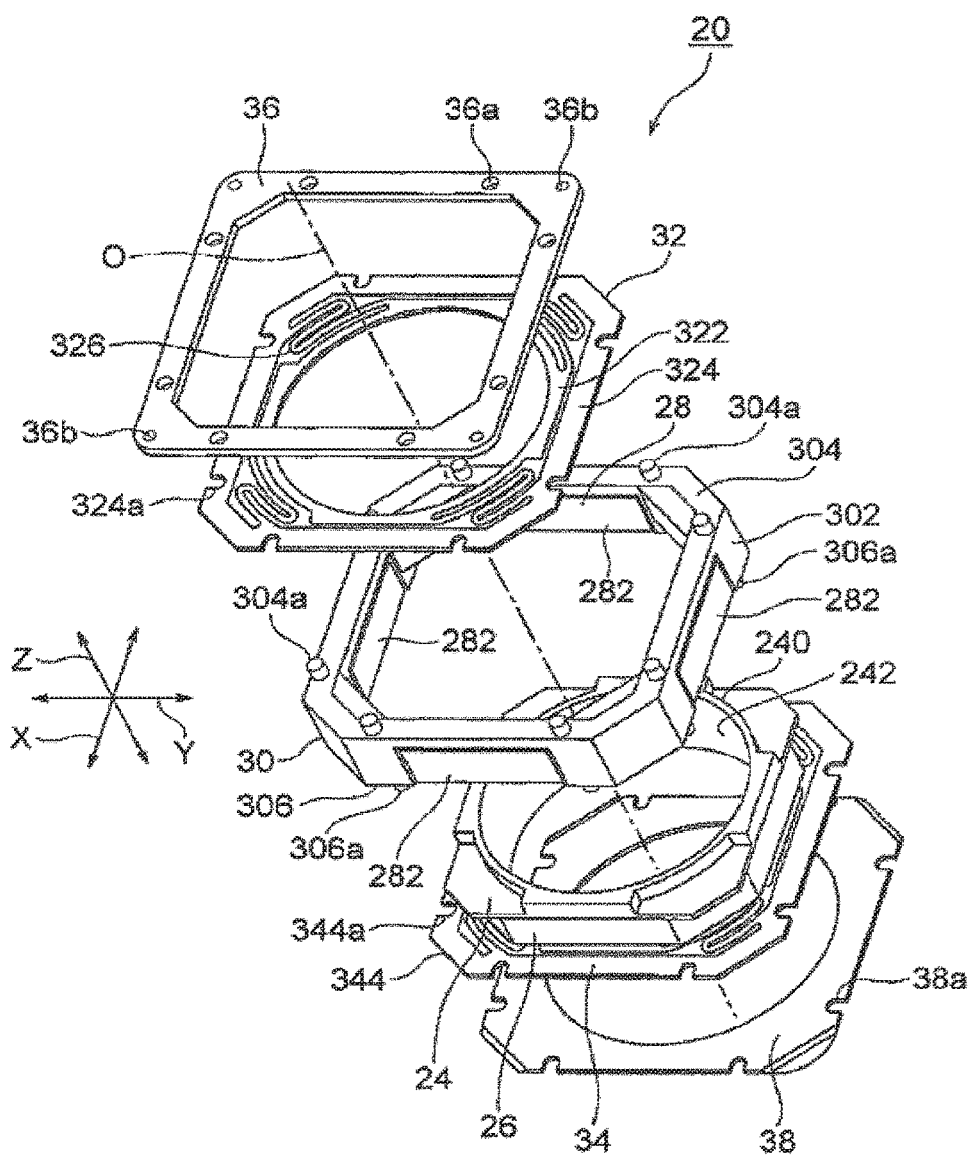
FIG. 2 is an exploded oblique view of auto-focusing lens drive apparatus 20 used in the camera-shake correction apparatus shown in FIG. 1.
Figure 3:
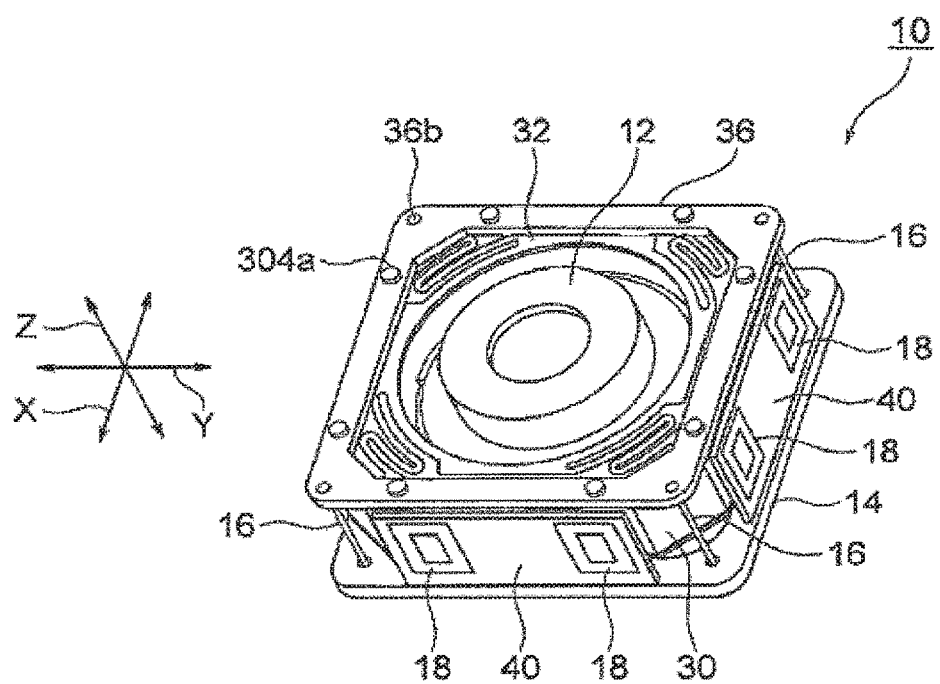
FIG. 3 is an assembled oblique view, excluding the cover, of the camera-shake correction apparatus shown in FIG. 1.

Camera-shake correction apparatus 10 according to a first embodiment of the present invention will now be described with reference to FIG. 1 through FIG. 3. FIG. 1 is an exploded oblique view of camera-shake correction apparatus 10. FIG. 2 is an exploded oblique view of auto-focusing lens drive apparatus 20 used in camera-shake correction apparatus 10 shown in FIG. 1. FIG. 3 is an assembled oblique view, excluding shield cover 42, of camera-18 shake correction apparatus 10 shown in FIG. 1.

Here, orthogonal coordinate system (X,Y,Z) is used, as shown in FIG. 1 through FIG. 3. In the states illustrated in FIG. 1 through FIG. 3, in orthogonal coordinate system (X,Y,Z), the X-axis direction is the front-back direction (depth direction), the Y-axis direction is the horizontal direction (width direction), and the Z-axis direction is the vertical-direction (height direction). In the examples shown in FIG. 1 through FIG. 3, vertical direction Z is the lens optical axis O direction. In this first embodiment, the X-axis direction (front-back direction) is also referred to as the first direction, and the Y-axis direction (horizontal direction) is also referred to as the second direction.

In an actual usage situation, the optical axis O direction—that is, the Z-axis direction—is the front-back direction. In other words, the upward Z-axis direction is the forward direction, and the downward Z-axis direction is the rearward direction.

Camera-shake correction apparatus 10 illustrated is an apparatus that corrects camera shake (vibration) that occurs when a still image is captured with a small camera for mobile phone use, and enables a blur-free image to be captured. Camera-shake correction apparatus 10 corrects camera shake by moving the entirety of auto-focusing lens drive apparatus 20 in first direction (front-back direction) X and second direction (horizontal direction) Y that are perpendicular to optical axis O and are perpendicular to each other.

Auto-focusing lens drive apparatus 20 is for moving lens barrel 12 along optical axis O. Base printed wiring board (base) 14 is disposed so as to be spaced from the bottom surface of auto-focusing lens drive apparatus 20. Although not illustrated, an imaging device disposed on an imaging board is mounted on the bottom (rear part) of this base printed wiring board 14. This imaging device captures a subject image formed by means of lens barrel 12, and converts this subject image to an electrical signal. The imaging device comprises, for example, a CCD (charge coupled device) image sensor, CMOS (complementary metal oxide semiconductor) image sensor, or the like. Therefore, a camera module is configured by combining lens drive apparatus 20, an imaging board, and an imaging device.

Auto-focusing lens drive apparatus 20 will now be described with reference to FIG. 2.

Auto-focusing lens drive apparatus 20 is provided with lens holder 24 having tubular section 240 for holding lens barrel 12, focusing coil 26 fixed to this lens holder 24 so as to be positioned around tubular section 240, magnet holder 30 that holds permanent magnet 28 disposed on the outside of this focusing coil 26, facing focusing coil 26, and a pair of leaf springs 32 and 34 provided on either side of optical axis O of tubular section 240 of lens holder 24. The pair of leaf springs 32 and 34 support lens holder 24 so as to be displaceable in the optical axis O direction when lens holder 24 is positioned in a radial direction. Of the pair of leaf springs 32 and 34, leaf spring 32 is referred to as the upper leaf spring, and leaf spring 34 is referred to as the lower leaf spring.

As stated above, in an actual usage situation, the upward Z-axis direction (optical axis O direction) is the forward direction, and the downward Z-axis direction (optical axis O direction) is the rearward direction. Therefore, upper leaf spring 32 is also referred to as the front spring, and lower leaf spring 34 is also referred to as the rear spring.

Magnet holder 30 is of octagonally tubular shape. That is to say, magnet holder 30 has octagonally tubular outer tube section 302, octagonal upper ring-shaped end section 304 provided on the top (front) of this outer tube section 302, and octagonal lower ring-shaped end 306 provided on the bottom (rear) of outer tube section 302. Upper ring-shaped end section 304 has eight upper projections 304a projecting upward, and lower ring-shaped end 306 has eight lower projections 306a projecting downward.

Focusing coil 26 is of octagonally tubular shape matching the shape of octagonally tubular magnet holder 30. Permanent magnet 28 includes four permanent magnet sections 282 disposed on octagonally tubular outer tube section 302 of magnet holder 30 so as to be spaced from each other in first direction (front-back direction) X and second direction (horizontal direction) Y. In any event, permanent magnet 28 is disposed spaced from focusing coil 26.

Upper leaf spring (front spring) 32 is disposed above (forward) in the optical axis O direction in lens holder 24, and lower leaf spring (rear spring) 34 is disposed below (rearward) in the optical axis O direction in lens holder 24. Upper leaf spring (front spring) 32 and lower leaf spring (rear spring) 34 have almost identical configurations.

Upper leaf spring (front spring) 32 has upper inner ring section 322 attached to the top of lens holder 24, and upper outer ring section 324 attached to upper ring-shaped end section 304 of magnet holder 30. Four upper arm sections 326 are provided between upper inner ring section 322 and upper outer ring section 324. That is to say, four upper arm sections 326 link upper inner ring section 322 and upper outer ring section 324.

Upper outer ring section 324 has eight engaging notches 324a that engage respectively with eight upper projections 304a of magnet holder 30. Ring-shaped upper printed wiring board (upper board) 36 is disposed on the top of upper leaf spring (front spring) 32. Upper printed wiring board (upper board) 36 has eight upper board holes 36a into which eight upper projections 304a of magnet holder 30 are pressed (inserted) respectively. That is to say, eight upper projections 304a of magnet holder 30 are pressed (inserted) respectively into eight upper board holes 36a of ring-shaped upper printed wiring board (upper board) 36 via eight engaging notches 324a of upper outer ring section 324. That is to say, upper outer ring section 324 of upper leaf spring (front spring) 32 is fixed by being sandwiched between upper ring-shaped end section 304 of magnet holder 30 and ring-shaped upper printed wiring board 36.

Similarly, lower leaf spring (rear spring) 34 has a lower inner ring section (not illustrated) attached to the bottom of lens holder 24, and lower outer ring section 344 attached to lower ring-shaped end 306 of magnet holder 30. Four lower arm sections (not illustrated) are provided between the lower inner ring section and lower outer ring section 344. That is to say, four lower arm sections link the lower inner ring section and lower outer ring section 344.

Lower outer ring section 344 has eight lower engaging notches 344a that engage respectively with eight lower projections 306a of magnet holder 30. Ring-shaped stopper 38 is disposed on the bottom of lower leaf spring (rear spring) 34. Stopper 38 has eight stopper notches 38a into which eight lower projections 306a of magnet holder 30 are pressed (inserted) respectively. That is to say, eight lower projections 306a of magnet holder 30 are pressed (inserted) respectively into eight stopper notches 38a of stopper 38 via eight engaging notches 344a of lower outer ring section 344. That is to say, lower outer ring section 344 of lower leaf spring (rear spring) 34 is fixed by being sandwiched between lower ring-shaped end 306 of magnet holder 30 and stopper 38.

The elastic members comprising upper leaf spring 32 and lower leaf spring 34 function as guide sections that guide lens holder 24 so as to be able to move only in the optical axis O direction. Upper leaf spring 32 and lower leaf spring 34 are made of beryllium copper, phosphor bronze, or the like.

Internal thread 242 is cut into the inner peripheral wall of tubular section 240 of lens holder 24, and external thread 122 that is screwed into above internal thread 242 is cut into the outer peripheral wall of lens barrel 12. Therefore, to fit lens barrel 12 into lens holder 24, lens barrel 12 is accommodated inside lens holder 24 by turning lens barrel 12 about optical axis O and screwing lens barrel 12 into tubular section 240 of lens holder 24 in the optical axis O direction, and they are joined together by means of adhesive or the like.

By passing a current through focusing coil 26, it is possible to adjust the position of lens holder 24 (lens barrel 12) in the optical axis O direction through the mutual action of the magnetic field of permanent magnet 28 and a magnetic field by the current flowing through focusing coil 26.

Camera-shake correction apparatus 10 will now be described with reference to FIG. 1 and. FIG. 3.

Camera-shake correction apparatus 10 has four suspension wires 16 that each have one end fixed to one of the four corners of base printed wiring board (base) 14, and camera-shake correction coils 18 disposed on the outside of permanent magnet 28 of above auto-focusing lens drive apparatus 20, facing permanent magnet 28.

Four suspension wires 16 extend along optical axis O, and support the entirety of auto-focusing lens drive apparatus 20 so as to be able to rock in first direction (front-back direction) X and second direction (horizontal 24 direction) Y. The other ends of four suspension wires 16 are fixed to upper printed wiring board 36 of above auto-focusing lens drive apparatus 20. To be precise, upper printed wiring board 36 has four wire fixing holes 36b into which the other ends of four suspension wires 16 are inserted. The other ends of four suspension wires 16 are inserted into these four wire fixing holes 36b, and are fixed with adhesive, solder, or the like.

Two of four suspension wires 16 are used to supply power to focusing coil 26.

As described above, permanent magnet 28 includes four permanent magnet sections 282 disposed so as to face each other in first direction (front-back direction) X and second direction (horizontal direction) Y.

Camera-shake correction apparatus 10 is provided with four coil boards 40 disposed so as to face and be spaced from four permanent magnet sections 282 respectively. Above camera-shake correction coils 18 are formed on these four coil boards 40.

To be precise, a pair of camera-shake correction coils 18 are formed at either end of each coil board 40. Therefore, there are a total of eight camera-shake correction coils 18.

Four camera-shake correction coils 18 formed on two coil boards 40 disposed so as to face each other in second direction (horizontal direction) Y are for moving (rocking) auto-focusing lens drive apparatus 20 in first direction (front-back direction) X.

These four camera-shake correction coils 18 are referred to as first-direction actuator 18 (1).

On the other hand, four camera-shake correction coils 18 formed on two coil boards 40 disposed so as to face each other in first direction (front-back direction) X are for moving (rocking) auto-focusing lens drive apparatus 20 in second direction (horizontal direction) Y. These four camera-shake correction coils 18 are referred to as second-direction actuator 18 (2).

In any event, camera-shake correction coils 18 are for driving the entirety of auto-focusing lens drive apparatus 20 in the X-axis direction (first direction) and Y-axis direction second direction) in collaboration with permanent magnet 28. Also, the combination of camera-shake correction coils 18 and permanent magnet 28 functions as a voice coil motor (VCM).

Thus, camera-shake correction apparatus 10 illustrated corrects camera shake by moving lens barrel 12 itself, housed in auto-focusing lens drive apparatus 20, in first direction (front-back direction) X and second direction (horizontal direction) Y. Therefore, camera-shake correction apparatus 10 is referred to as a "barrel-shifting" camera-shake correction apparatus.

Camera-shake correction apparatus 10 is also provided with shield cover 42 that includes square tubular section 422 covering four coil boards 40. In the example illustrated, four coil boards 40 are attached to the inner wall of square tubular section 422 of shield cover 42 as shown in FIG. 1.

Camera-shake correction apparatus 10 illustrated is also provided with position detection section 50 for detecting the position of auto-focusing lens drive apparatus 20 with respect to base printed wiring board 14. Position detection section 50 illustrated comprises four Hall devices 50 mounted on base printed wiring board 14. These four Hall devices 50 are disposed facing and spaced from four permanent magnet sections 282.

A pair of Hall devices 50 disposed facing in first direction (front-back direction) X detect a first position associated with first direction (front-back direction) X movement (rocking) by detecting magnetic force of a pair of permanent magnet sections 282 facing them. A pair of Hall devices 50 disposed facing in second direction (horizontal direction) Y detect a second position associated with second direction (horizontal direction) Y movement (rocking) by detecting magnetic force of a pair of permanent magnet sections 282 facing them.

Figure 4:
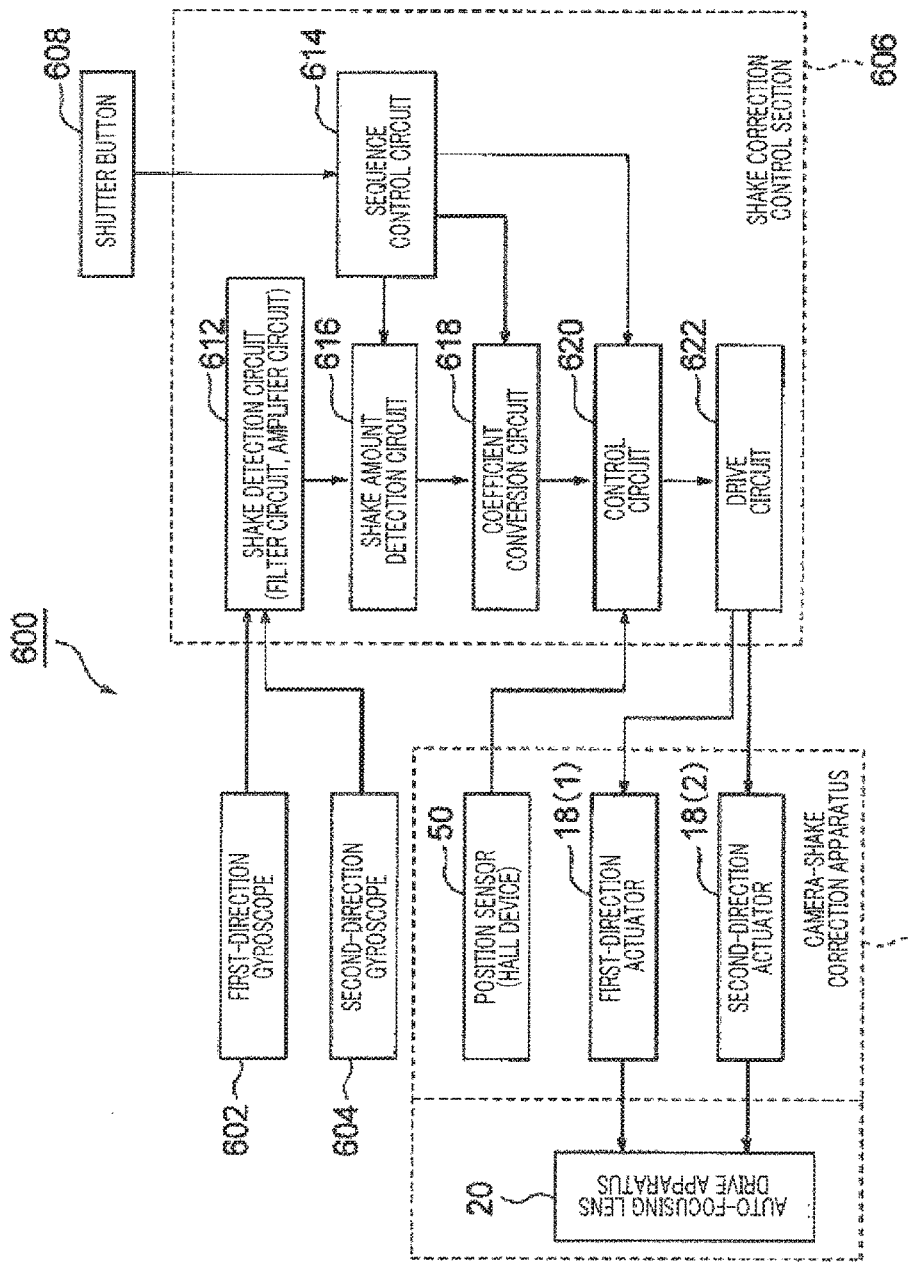
FIG. 4 is a block diagram showing the configuration of a camera-shake correction actuator that controls the camera-shake correction apparatus shown in FIG. 1 through FIG. 3.

FIG. 4 is a block diagram showing the configuration of camera-shake correction actuator 600 that controls camera-shake correction apparatus 10. Camera-shake correction apparatus 10 is installed in a camera-equipped mobile phone (not illustrated).

The housing of a camera-equipped mobile phone (not illustrated) is provided with first-direction gyroscope 602 for detecting first direction (front-back direction) X shake, and second-direction gyroscope 604 for detecting second direction (horizontal direction) Y shake.

First-direction gyroscope 602 detects first direction (front-back direction) X angular velocity, and outputs a first angular velocity signal representing the detected first direction (front-back direction) X angular velocity. Second-direction gyroscope 604 detects second direction (horizontal direction) Y angular velocity, and outputs a second angular velocity signal representing the detected second direction (horizontal direction) Y angular velocity. The first and second angular velocity signals are supplied to shake correction control section 606. A shutter operation command signal is supplied to shake correction control section 606 from shutter button 608.

Shake correction control section 606 has shake detection circuit 612 that detects shake of the camera-equipped mobile phone housing from the first and second angular velocity detection signals, and sequence control circuit 614 that receives a shutter operation command signal. Shake detection circuit 612 includes a filter circuit and amplifier circuit. Shake detection circuit 612 supplies a shake detection signal to shake amount detection circuit 616. Shake amount detection circuit 616 detects a shake amount of the camera-equipped mobile phone housing from the shake detection signal, and sends a shake amount detection signal to coefficient conversion circuit 618. Coefficient conversion circuit 618 performs coefficient conversion of the shake amount detection signal, and sends a coefficient-converted signal to control circuit 620. A position detection signal from position detection section (position sensor) 50 provided in camera-shake correction apparatus 10 is supplied to this control circuit 620.

In response to the coefficient-converted signal, control circuit 620 outputs a control signal so as to cancel out shake detected by shake detection circuit 612 based on the position detection signals. In response to a shutter operation command signal, sequence control circuit 614 controls the timing of shake amount detection circuit 616, coefficient conversion circuit 618, and control circuit 620. The control signal is supplied to drive circuit 622.

As stated earlier, camera-shake correction apparatus 10 is provided with first-direction actuator 18 (1) for moving (rocking) the entirety of auto-focusing lens drive apparatus 20 in first direction (front-back direction) X, and second-direction actuator 18 (2) for moving (rocking) the entirety of auto-focusing lens drive apparatus 20 in second direction (horizontal direction) Y, as voice coil motors. In any event, camera-shake correction apparatus 10 includes first-direction actuator 18 (1) and second-direction actuator 18 (2).

Drive circuit 622 drives first-direction actuator 18 (1) and second-direction actuator 18 (2) in response to a control signal.

By means of such a configuration, camera-shake correction apparatus 10 can move (rock) the entirety of auto-focusing lens drive apparatus 20 so as to cancel out shake of a camera-equipped mobile phone housing. As a result, camera shake can be corrected.

Camera-shake correction apparatus 10 according to a first embodiment of the present invention as described above achieves the following effects.

Since auto-focusing lens drive apparatus 20 is provided with camera-shake correction apparatus 10, and permanent magnet 28 is used in common, the number of component parts can be reduced. As a result, the size (mainly the height) of camera-shake correction apparatus 10 can be made smaller (lower).

In an optical unit tilting type of camera-shake correction apparatus, there is a rotation shaft, and consequently friction occurs between a hole and shaft, resulting in the occurrence of hysteresis. In contrast, in camera-shake correction apparatus 10 according to this first embodiment, the entirety of auto-focusing lens drive apparatus 20 is supported mechanically by four suspension wires 16, making hysteresis unlikely to occur.

Compared with camera-shake correction apparatuses using conventional optical camera-shake correction methods (lens shifting, sensor shifting, or optical unit tilting), the use of a barrel-shifting method enables the size (mainly the height) of camera-shake correction apparatus 10 to be made virtually the same that of auto-focusing lens drive apparatus 20. As a result, it is possible for camera-shake correction apparatus 10 according to this first embodiment to be installed in an optical camera-shake correcting camera for mobile phone use.

In this first embodiment, a magnetic position detection section comprising Hall devices 50 is used as a position detection section (position sensor), but another position detection section (position sensor) such as a photoreflector or suchlike optical position detection section may be used instead of Hall devices 50.

Also, in the above-described first embodiment, permanent magnet 28 comprises four permanent magnet sections 282 disposed so as to face each other in first direction X and second direction Y, but the number of permanent magnet sections is not limited to four, and, for example, eight sections may be used that are disposed facing in diagonal directions rather than in only a first and second direction. In this case, the number of camera-shake correction coils 18 and the number of coil boards 40 are also changed in line with the number of permanent magnet sections 288. Furthermore, in the above-described first embodiment, one end of each of four suspension wires 16 is fixed to one of the four corners of base 14, but these ends may also be fixed to the outer periphery of base 14. Moreover, the number of suspension wires 16 is not limited to four, and may be any plurality.

Figure 5:
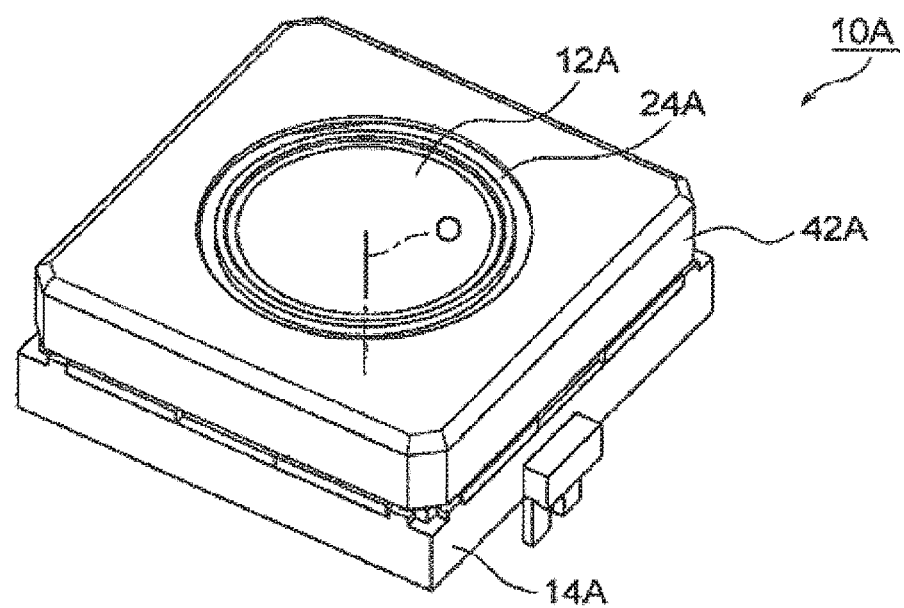
FIG. 5 is an external oblique view of a camera-shake correction apparatus according to a second embodiment of the present invention.
Figure 5:
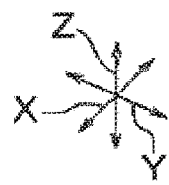
Figure 6:
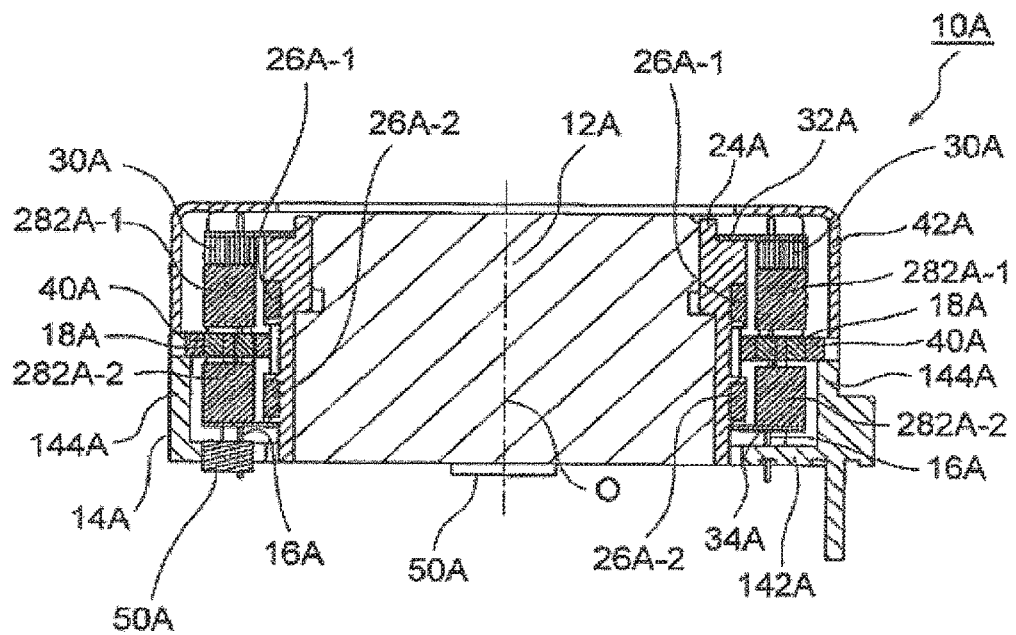
FIG. 6 is a vertical cross-sectional view of the camera-shake correction apparatus shown in FIG. 5.
Figure 7:
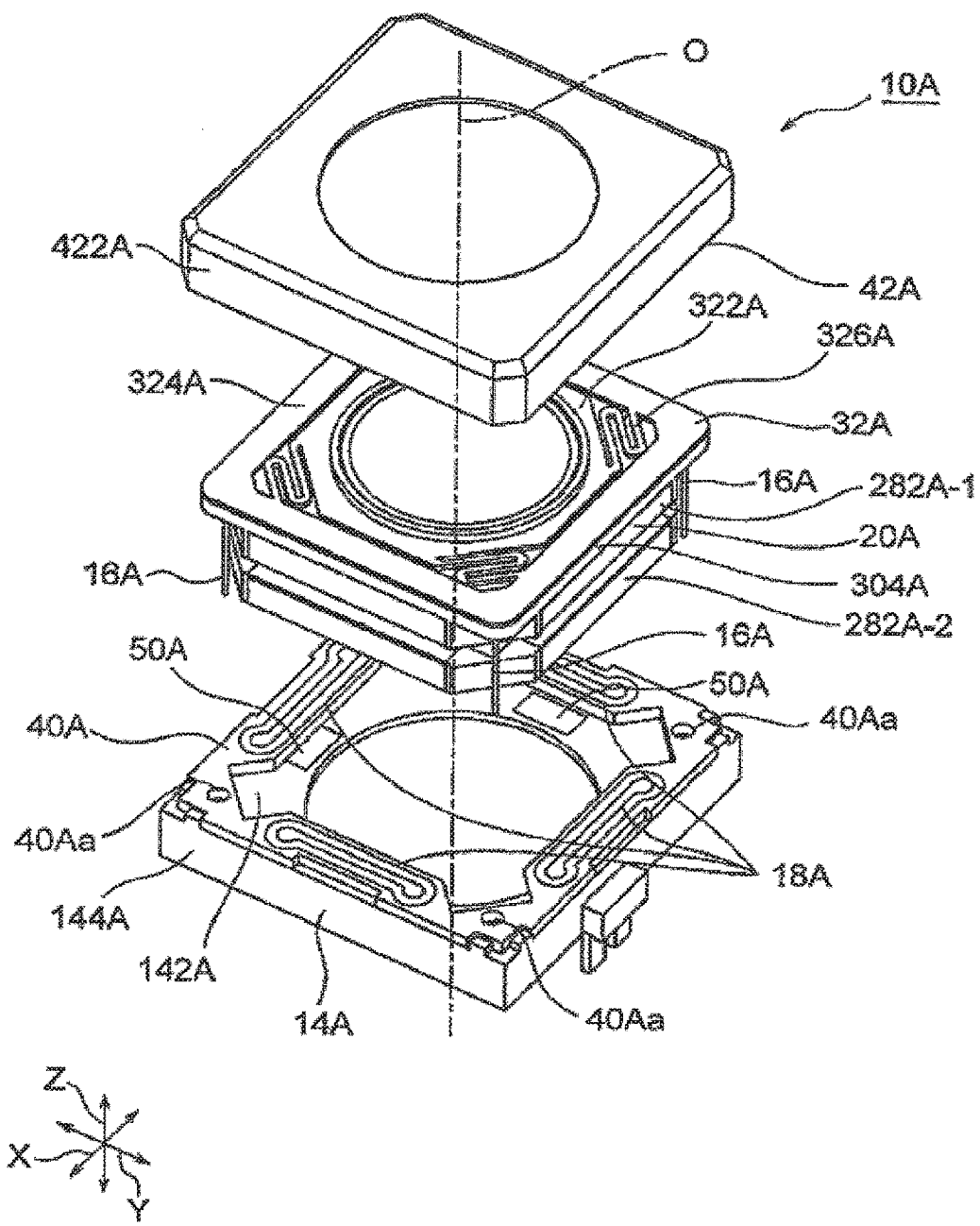
FIG. 7 is an exploded oblique view of the camera-shake correction apparatus shown in FIG. 5.
Figure 8:
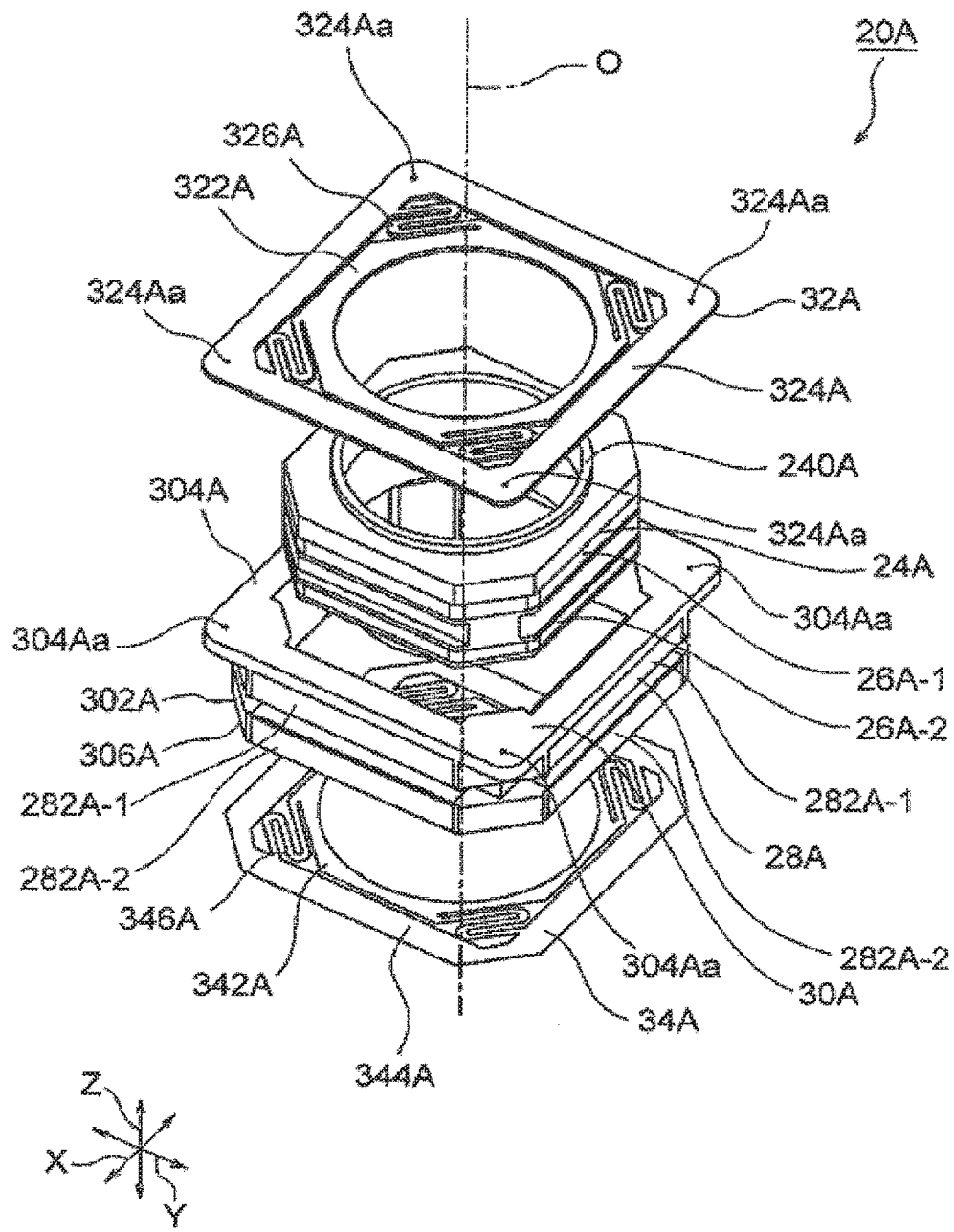
FIG. 8 is an exploded oblique view of an auto-focusing lens drive apparatus used in the camera-shake correction apparatus shown in FIG. 5.

Camera-shake correction apparatus 10A according to a second embodiment of the present invention will now be described with reference to FIG. 5 through FIG. 8. FIG. 5 is an external oblique view of camera-shake correction apparatus 10A. FIG. 6 is a vertical cross-sectional view of camera-shake correction apparatus 10A. FIG. 7 is an exploded oblique view of camera-shake correction apparatus 10A. FIG. 8 is an exploded oblique view of auto-focusing lens drive apparatus 20A used in camera-shake correction apparatus 10A shown in FIG. 5.

Here, orthogonal coordinate system (X,Y,Z) is used, as shown in FIG. 5 through FIG. 8. In the states illustrated in FIG. 5 through FIG. 8, in orthogonal coordinate system (X,Y,Z), the X-axis direction is the front-back direction (depth direction), the Y-axis direction is the horizontal direction (width direction), and the Z-axis direction is the vertical-direction (height direction). In the examples shown in FIG. 5 through FIG. 8, vertical direction Z is the lens optical axis O direction. In this second embodiment, the X-axis direction (front-back direction) is also referred to as the first direction, and the Y-axis direction (horizontal direction) is also referred to as the second direction.

In an actual usage situation, the optical axis O direction—that is, the Z-axis direction—is the front-back direction. In other words, the upward Z-axis direction is the forward direction, and the downward Z-axis direction is the rearward direction.

Camera-shake correction apparatus 10A illustrated is an apparatus that corrects camera shake (vibration) that occurs when a still image is captured with a small camera for mobile phone use, and enables a blur-free image to be captured. Camera-shake correction apparatus 10A corrects camera shake by moving the entirety of auto-focusing lens drive apparatus 20A in first direction (front-back direction) X and second direction (horizontal direction) Y that are perpendicular to optical axis O and are perpendicular to each other.

Auto-focusing lens drive apparatus 20A is for moving lens barrel 12A along optical axis O. Base 14A is disposed so as to be spaced from the bottom surface of auto-focusing lens drive apparatus 20A. Although not illustrated, an imaging device disposed on an imaging board is mounted on the bottom (rear part) of this base 14A. This imaging device captures a subject image formed by means of lens barrel 12A, and converts this subject image to an electrical signal. The imaging device comprises, for example, a CCD (charge coupled device) image sensor, CMOS (complementary metal oxide semiconductor) image sensor, or the like. Therefore, a camera module is configured by combining lens drive apparatus 20A, an imaging board, and an imaging device.

Base 14A comprises ring-shaped base section 142A of square external shape and having a circular aperture inside, and square-tube-shaped tubular section 144A that projects in the upward optical axis O direction from the outer edge of this base section 142A.

Camera-shake correction apparatus 10A has four suspension wires 16A that each have one end fixed to one of the four corners of base section 142A of base 14A, and camera-shake correction coils 18A disposed so as to face permanent magnet 28A of auto-focusing lens drive apparatus 20A described later herein in a manner described later herein.

Four suspension wires 16A extend along optical axis O, and support the entirety of auto-focusing lens drive apparatus 20A so as to be able to rock in first direction (front-back direction) X and second direction (horizontal direction) Y. The other ends of four suspension wires 16A are fixed to the upper end of above auto-focusing lens drive apparatus 20A as described later herein.

As described later herein, camera-shake correction apparatus 10A is provided with one square-ring-shaped coil board 40A disposed so as to face and be spaced from permanent magnet 28A. This coil board 40A is attached to the upper end of tubular section 144A of base 14A. Above camera-shake correction coils 18A are formed on this coil board 40A.

Auto-focusing lens drive apparatus 20A will now be described with reference to FIG. 8.

Auto-focusing lens drive apparatus 20A is provided with lens holder 24A having tubular section 240A for holding lens barrel 12A, first and second focusing coils 26A-1 and 26A-2 fixed to this lens holder 24A so as to be positioned around tubular section 240A, magnet holder 30A that holds permanent magnet 28A disposed on the outside of first and second focusing coils 26A-1 and 26A-2, facing first and second focusing coils 26A-1 and 26A-2, and a pair of leaf springs 32A and 34A provided on either side of optical axis O of tubular section 240A of lens holder 24A.

First focusing coil 26A-1 is installed in the upper optical axis O direction of tubular section 240A of lens holder 24A, and second focusing coil 26A-2 is installed in the lower optical axis O direction of tubular section 240A of lens holder 24A.

The pair of leaf springs 32A and 34A support lens holder 24A so as to be displaceable in the optical axis O direction when lens holder 24A is positioned in a radial direction. Of the pair of leaf springs 32A and 34A, leaf spring 32A is referred to as the upper leaf spring, and leaf spring 34A is referred to as the lower leaf spring.

As stated above, in an actual usage situation, the upward Z-axis direction (optical axis O direction) is the forward direction, and the downward Z-axis direction (optical axis O direction) is the rearward direction. Therefore, upper leaf spring 32A is also referred to as the front spring, and lower leaf spring 34A is also referred to as the rear spring.

Magnet holder 30A is of octagonally tubular shape. That is to say, magnet holder 30A has octagonally tubular outer tube section 302A, square upper ring-shaped end section 304A provided on the top (front) of this outer tube section 302A, and octagonal lower ring-shaped end 306A provided on the bottom (rear) of outer tube section 302A.

First and second focusing coils 26A-1 and 26A-2 are each of octagonally tubular shape matching the shape of octagonally tubular magnet holder 30A. Permanent magnet 28A comprises eight rectangular permanent magnet sections disposed on octagonally tubular outer tube section 302A of magnet holder 30*a* so as to be spaced from each other in first direction (front-back direction) X, second direction (horizontal direction) Y, and vertical direction Z. Of these eight rectangular permanent magnet sections, four first permanent magnet sections 282A-1 are disposed in the upper optical axis O direction of outer tube section 302A, and remaining four second permanent magnet sections 282A-2 are disposed in the lower optical axis O direction of outer tube section 302A. Four first permanent magnet sections 282A-1 are disposed spaced from first focusing coil 26A-1, and four second permanent magnet sections 282A-2 are disposed spaced from second focusing coil 26A-2.

Upper leaf spring (front spring) 32A is disposed above (forward) in the optical axis O direction in lens holder 24A, and lower leaf spring (rear spring) 34A is disposed below (rearward) in the optical axis O direction in lens holder 24A. Upper leaf spring (front spring) 32A and lower leaf spring (rear spring) 34A have almost identical configurations.

Upper leaf spring (front spring) 32A has upper inner ring section 322A attached to the top of lens holder 24A, and upper outer ring section 324A attached to upper ring-shaped end section 304A of magnet holder 30A. Four upper arm sections 326A are provided between upper inner ring section 322A and upper outer ring section 324A. That is to say, four upper arm sections 326A link upper inner ring section 322A and upper outer ring section 324A.

Upper outer ring section 324A has four wire fixing holes 324Aa into which the other ends of above four suspension wires 16A are inserted.

Similarly, lower leaf spring (rear spring) 34A has lower inner ring section 342A attached to the bottom of lens holder 24A, and lower outer ring section 344A attached to lower ring-shaped end 306A of magnet holder 30A. Four lower arm sections 346A are provided between lower inner ring section 342A and upper outer ring section 344A. That is to say, four lower arm sections 346A link lower inner ring section 342A and lower outer ring section 344A.

The elastic members comprising upper leaf spring 32A and lower leaf spring 34A function as guide sections that guide lens holder 24A so as to be able to move only in the optical axis O direction. Upper leaf spring 32A and lower leaf spring 34A are made of beryllium copper, phosphor bronze, or the like.

An internal thread (not illustrated) is cut into the inner peripheral wall of tubular section 240A of lens holder 24A, and an external thread (not illustrated) that is screwed into the above internal thread is cut into the outer peripheral wall of lens barrel 12A. Therefore, to fit lens barrel 12A into lens holder 24A, lens barrel 12A is accommodated inside lens holder 24A by turning lens barrel 12A about optical axis O and screwing lens barrel 12A into tubular section 240A of lens holder 24A in the optical axis O direction, and they are joined together by means of adhesive or the like.

By passing first and second auto-focusing (AF) currents through first and second focusing coils 26A-1 and 26A-2 respectively as described later herein, it is possible to adjust the position of lens holder 24A (lens barrel 12A) in the optical axis O direction through the mutual action of the magnetic field of permanent magnet 28A and magnetic fields by the AF currents flowing through first and second focusing coils 26A-1 and 26A-2.

Camera-shake correction apparatus 10A will now be described in further detail with reference to FIG. 6 and FIG. 7.

As stated earlier, camera-shake correction apparatus 10A has four suspension wires 16A that each have one end fixed to one of the four corners of base section 142A of base 14A, and camera-shake correction coils 18A disposed on the outside of permanent magnet 28A of above auto-focusing lens drive apparatus 20A, facing permanent magnet 28A.

Four suspension wires 16A extend along optical axis O, and support the entirety of auto-focusing lens drive apparatus 20A so as to be able to rock in first direction (front-back direction) X and second direction (horizontal direction) Y. The other ends of four suspension wires 16A are fixed to the top of above auto-focusing lens drive apparatus 20A.

To be precise, as stated earlier, upper outer ring section 324A has four wire fixing holes 324Aa into which the other ends of four suspension wires 16A are inserted (see FIG. 8). Also, upper ring-shaped end section 304A of magnet holder 30A has four wire insertion holes 304Aa into which the other ends of four suspension wires 16A are inserted (see FIG. 8). The other ends of four suspension wires 16A are inserted into four wire fixing holes 324Aa via these four wire insertion holes 304Aa, and are fixed with adhesive, solder, or the like.

Four suspension wires 16A are used to supply current to first and second focusing coils 26A-1 and 26A-2.

As described above, permanent magnet 28A comprises four first permanent magnet sections 282A-1 and four second permanent magnet sections 282A-2 disposed so as to face each other in first direction (front-back direction) X and second direction (horizontal direction) Y, and to be spaced vertically in the optical axis O direction.

Camera-shake correction apparatus 10A is provided with one square-ring-shaped coil board 40A disposed so as to be inserted between and spaced from four first permanent magnet sections 282A-1 and four second permanent magnet sections 282A-2. Coil board 40A has through-holes 40Aa at its four corners for the passage of four suspension wires 16A. Above camera-shake correction coils 18A are formed on this one coil board 40A.

Figure 9:
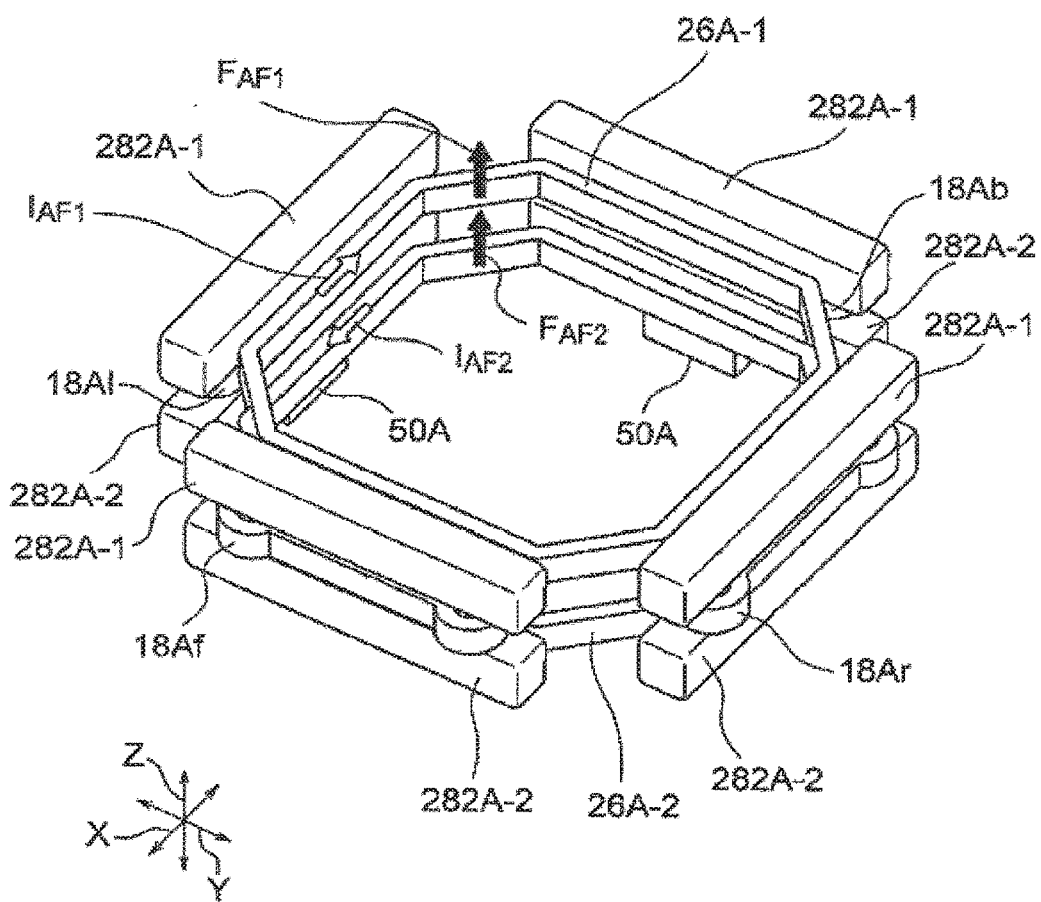
FIG. 9 is an oblique view of a magnetic circuit used in the camera-shake correction apparatus shown in FIG. 6 and FIG. 7.

To be precise, four camera-shake correction coils 18Af, 18Ab, 18Al, and 18Ar are formed on coil board 40A as camera-shake correction coils 18A (see FIG. 9).

Two camera-shake correction coils 18Af and 18Ab disposed so as to face each other in first direction (front-back direction) X are for moving (rocking) auto-focusing lens drive apparatus 20A in first direction (front-back direction) X. These two camera-shake correction coils 18Af and 18Ab are referred to as the first-direction actuator. Here, camera-shake correction coil 18Af located forward with respect to optical axis O is referred to as the "front camera-shake correction coil," and camera-shake correction coil 18Ab located rearward with respect to optical axis O is referred to as the "back camera-shake correction coil."

On the other hand, two camera-shake correction coils 18Al and 18Ar disposed so as to face each other in second direction (horizontal direction) Y are for moving (rocking) auto-focusing lens drive apparatus 20A in second direction (horizontal direction) Y. These two camera-shake correction coils 18Al and 18Ar are referred to as the second-direction actuator. Here, camera-shake correction coil 18Al located leftward with respect to optical axis O is referred to as the "left camera-shake correction coil," and camera-shake correction coil 18Ar located rightward with respect to optical axis O is referred to as the "right camera-shake correction coil."

In any event, four camera-shake correction coils 18Af, 18Ab, 18Al, and 18Ar are for driving the entirety of auto-focusing lens drive apparatus 20A in the X-axis direction (first direction) and Y-axis direction second direction) in collaboration with permanent magnet 28A. Also, the combination of four camera-shake correction coils 18Af, 18Ab, 18Al, and 18Ar and permanent magnet 28A functions as a voice coil motor (VCM).

Thus, camera-shake correction apparatus 10A illustrated corrects camera shake by moving lens barrel 12A itself, housed in auto-focusing lens drive apparatus 20A, in first direction (front-back direction) X and second direction (horizontal direction) Y. Therefore, camera-shake correction apparatus 10A is referred to as a "barrel-shifting" camera-shake correction apparatus.

Camera-shake correction apparatus 10A is also provided with cover 42A that includes square tubular section 422A covering the upper part (four first permanent magnet sections 282A-1) of auto-focusing lens drive apparatus 20A.

Figure 10:
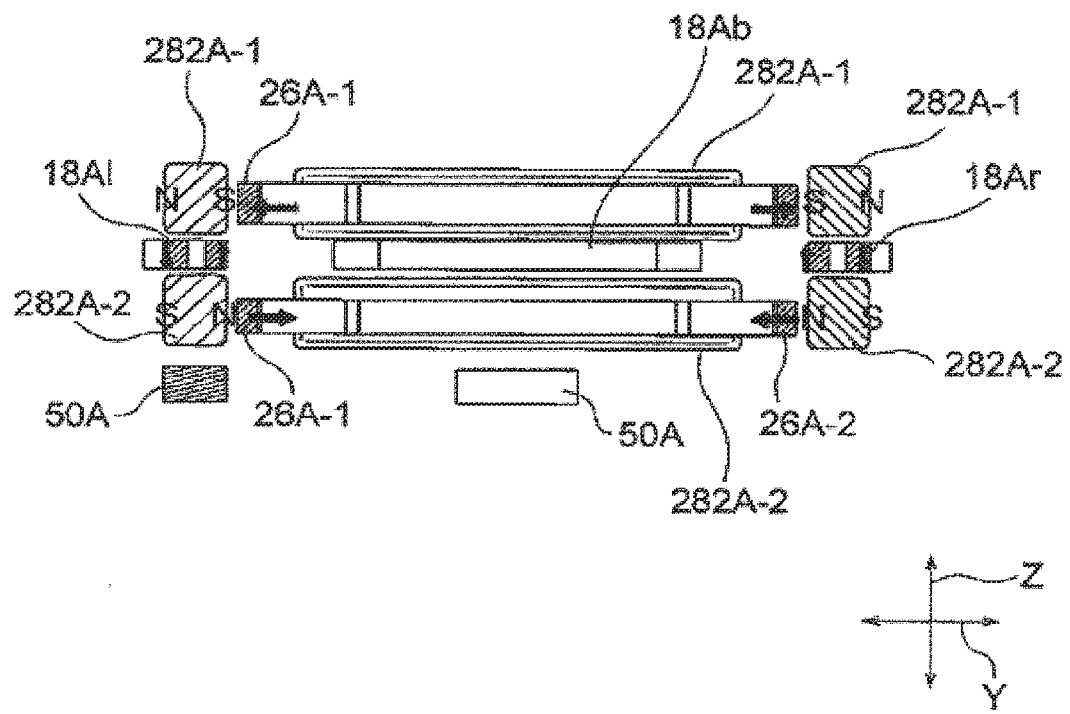
FIG. 10 is a vertical cross-sectional view of the magnetic circuit shown in FIG. 9.

Camera-shake correction apparatus 10A illustrated is also provided with position detection section 50A for detecting the position of auto-focusing lens drive apparatus 20A with respect to base 14A. Position detection section 50A illustrated comprises a magnetic position detection section composed of two Hall devices 50A mounted on base section 142A of base 14A. These two Hall devices 50A are disposed facing and spaced from two of four second permanent magnet sections 282A-2. As shown in FIG. 10, Hall devices 50A are disposed so as to intersect the direction from the N pole to the S pole in second permanent magnet sections 282A-2.

One Hall device 50A disposed in first direction (front-back direction) X with respect to optical axis O detects a first position associated with first direction (front-back direction) X movement (rocking) by detecting magnetic force of one second permanent magnet section 282A-2 facing it. One Hall device 50A disposed in second direction (horizontal direction) Y with respect to optical axis O detects a second position associated with second direction (horizontal direction) Y movement (rocking) by detecting magnetic force of one second permanent magnet section 282A-2 facing it.

In camera-shake correction apparatus 10A according to the second embodiment, a magnetic position detection section comprising two Hall devices 50A is used as position detection section 50A, but a magnetic position detection section comprising four Hall devices 50 may also be used, as in camera-shake correction apparatus 10 according to the first embodiment described earlier.

Figure 11:
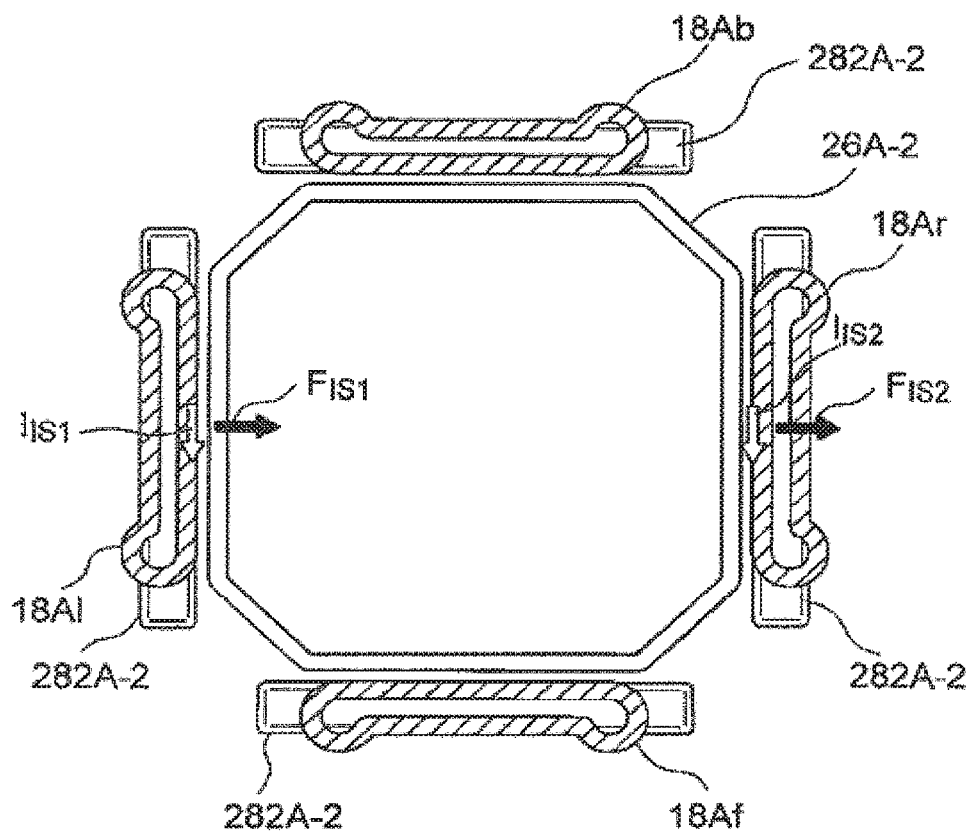
FIG. 11 is a plan view with four first permanent magnet sections and a first focusing coil omitted from the magnetic circuit shown in FIG. 9.

A magnetic circuit used in camera-shake correction apparatus 10A shown in FIG. 6 and FIG. 7 will now be described in detail with reference to FIG. 9 through FIG. 11. FIG. 9 is an oblique view of the magnetic circuit, and FIG. 10 is a vertical cross-sectional view of the magnetic circuit. FIG. 11 is a plan view with four first permanent magnet sections 282A-2 and first focusing coil 26A-1 omitted from the magnetic circuit.

Four first permanent magnet sections 282A-1 and four second permanent magnet sections 282A-2 have different adjacent pole magnetization in outward and inward radial directions of lens holder 24A. For example, as shown in FIG. 10, first permanent magnet sections 282A-1 have inward S pole magnetization and outward N pole magnetization, while four second permanent magnet sections 282A-2 have outward S pole magnetization and inward N pole magnetization. The arrows in FIG. 10 indicate the directions of magnetic flux generated by these permanent magnet sections 282A-1 and 282A-2.

Operation when the position of lens holder 24A (lens barrel 12A) is adjusted in the optical axis O direction will now be described with reference to FIG. 9.

A first AF current and second AF current flow in different directions from each other in first focusing coil 26A-1 and second focusing coil 26A-2 respectively. For example, as shown in FIG. 9, in first focusing coil 26A-1, a first AF current flows in a clockwise direction as indicated by arrow I.sub.AF1, and in second focusing coil 26A-2, a second AF current flows in a counterclockwise direction as indicated by arrow I.sub.AF2.

As shown in FIG. 9, in this case, according to Fleming's left hand rule, an upward magnetic force acts on first focusing coil 26A-1 as indicated by arrow F.sub.AF1, and an upward magnetic force also acts on second focusing coil 26A-2 as indicated by arrow F.sub.AF2. As a result, lens holder 24A (lens barrel 12A) can be moved in the upward optical axis O direction.

Conversely, by passing a first AF current through first focusing coil 26A-1 in a counterclockwise direction, and passing a second AF current through second focusing coil 26A-2 in a clockwise direction, lens holder 24A (lens barrel 12A) can be moved in the downward optical axis O direction.

Operation when the entirety of auto-focusing lens drive apparatus 20A is moved in first direction (front-back direction) X or second direction (horizontal direction) Y will now be described with reference to FIG. 11.

First, operation when the entirety of auto-focusing lens drive apparatus 20A is moved in second direction (horizontal direction) Y will be described. In this case, as shown in FIG. 11, in left camera-shake correction coil 18Al a first camera-shake correction (IS) current flows in a clockwise direction as indicated by arrow I.sub.IS1, and in right camera-shake correction coil 18Ar a second camera-shake correction (IS) current flows in a counterclockwise direction as indicated by arrow I.sub.IS2.

In this case, according to Fleming's left hand rule, a left-direction magnetic force acts on left camera-shake correction coil 18Al, and a left-direction magnetic force also acts on right camera-shake correction coil 18Ar. However, since these camera-shake correction coils 18Al and 18Ar are fixed to base 14A, as a reaction thereto, right-direction magnetic forces as indicated by arrows F.sub.IS1 and F.sub.IS2 in FIG. 11 act on the entirety of auto-focusing lens drive apparatus 20A. As a result, the entirety of auto-focusing lens drive apparatus 20A can be moved in a rightward direction.

Conversely, by passing a first IS current through left camera-shake correction coil 18Al in a counterclockwise direction, and passing a second IS current through right camera-shake correction coil 18Ar in a clockwise direction, the entirety of auto-focusing lens drive apparatus 20A can be moved in a leftward direction.

On the other hand, by passing a third IS current through back camera-shake correction coil 18Ab in a clockwise direction, and passing a fourth IS current through front camera-shake correction coil 18Af in a counterclockwise direction, the entirety of auto-focusing lens drive apparatus 20A can be moved in a forward direction.

Also, by passing a third IS current through back camera-shake correction coil 18Ab in a counterclockwise direction, and passing a fourth IS current through front camera-shake correction coil 18Af in a clockwise direction, the entirety of auto-focusing lens drive apparatus 20A can be moved in a rearward direction.

In this way, camera shake can be corrected.

Camera-shake correction apparatus 10A according to a second embodiment of the present invention as described above achieves the following effects.

Since auto-focusing lens drive apparatus 20A is provided with camera-shake correction apparatus 10A, and permanent magnet 28A is used in common, the number of component parts can be reduced. As a result, the size (mainly the height) of camera-shake correction apparatus 10A can be made smaller (lower).

In an optical unit tilting type of camera-shake correction apparatus, there is a rotation shaft, and consequently friction occurs between a hole and shaft, resulting in the occurrence of hysteresis. In contrast, in camera-shake correction apparatus 10A according to this second embodiment, the entirety of auto-focusing lens drive apparatus 20A is supported mechanically by four suspension wires 16A, making hysteresis unlikely to occur.

Compared with camera-shake correction apparatuses using conventional optical camera-shake correction methods (lens shifting, sensor shifting, or optical unit tilting). the use of a barrel-shifting method enables the size (mainly the height) of camera-shake correction apparatus 10A to be made virtually the same that of auto-focusing lens drive apparatus 20A. As a result, it is possible for camera-shake correction apparatus 10A according to this second embodiment to be installed in an optical camera-shake correcting camera for mobile phone use.

Also, since camera-shake correction coils 18A are disposed between upper four first permanent magnet sections 282A-1 and lower four second permanent magnet sections 282A-2, it is possible to implement highly sensitive actuators.

In this second embodiment, a magnetic position detection section comprising two Hall devices 50A is used as a position detection section (position sensor), but another position detection section (position sensor) such as a photoreflector or suchlike optical position detection section may be used instead of Hall devices 50A.

In the above-described second embodiment, permanent magnet 28A comprises four first permanent magnet sections 282A-1 and four second permanent magnet sections 282A-2 disposed so as to face each other in first direction X and second direction Y, and to be spaced vertically in the optical axis O direction, but the number of first permanent magnet sections and second permanent magnet sections is not limited to four each, and, for example, eight sections may be used that are disposed facing in diagonal directions rather than in only a first and second direction. In this case, the number of camera-shake correction coils 18A is also changed to eight. Also, in the above-described second embodiment, four suspension wires 16A rise up from the four corners of base section 142A of base 14A, but these ends may also rise up from the outer periphery of base section 142A. Furthermore, the number of suspension wires 16A is not limited to four, and may be any plurality.

Camera-shake correction apparatuses 10 and 10A according to the first and second embodiments described above use a "moving magnet method" in which permanent magnets 18 and 18A are moved. However, a "moving coil method" in which a coil is moved may also be used. By this means, moving parts of an auto-focusing lens drive apparatus can be made lighter.

Figure 12:
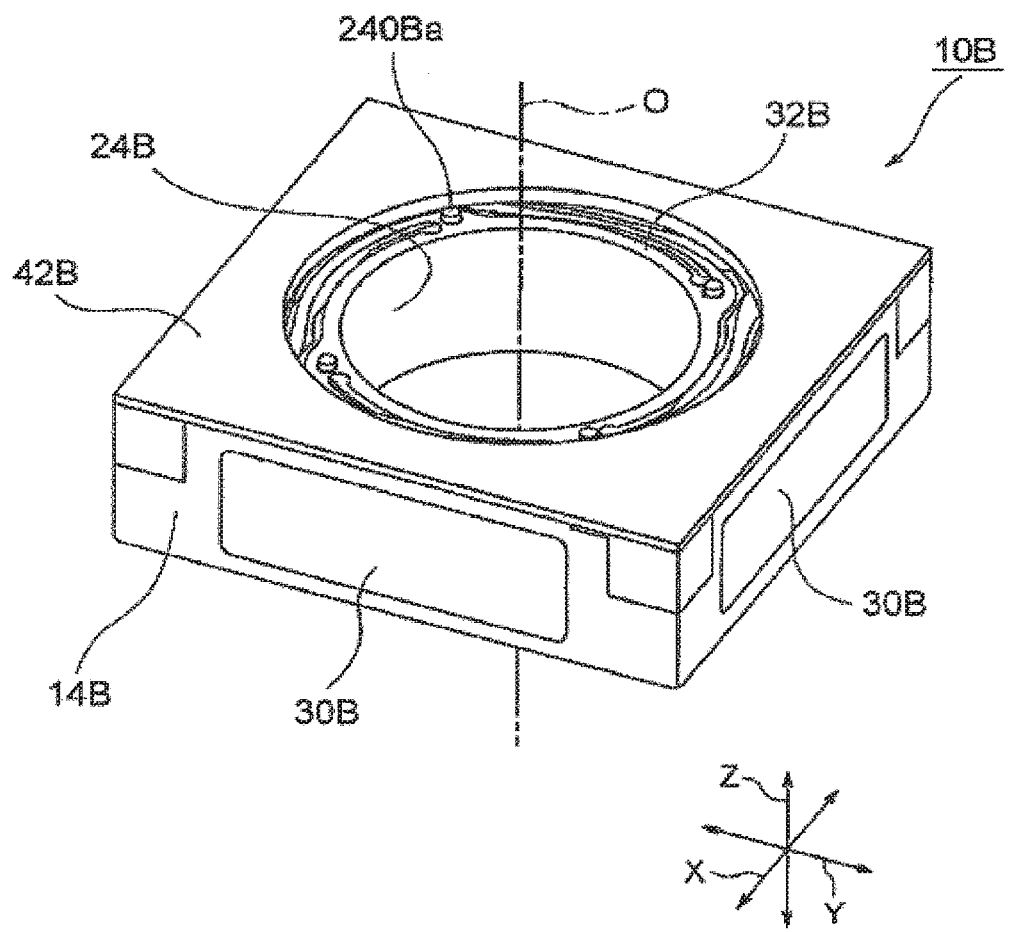
FIG. 12 is an external oblique view of a camera-shake correction apparatus according to a third embodiment of the present invention.
Figure 13:
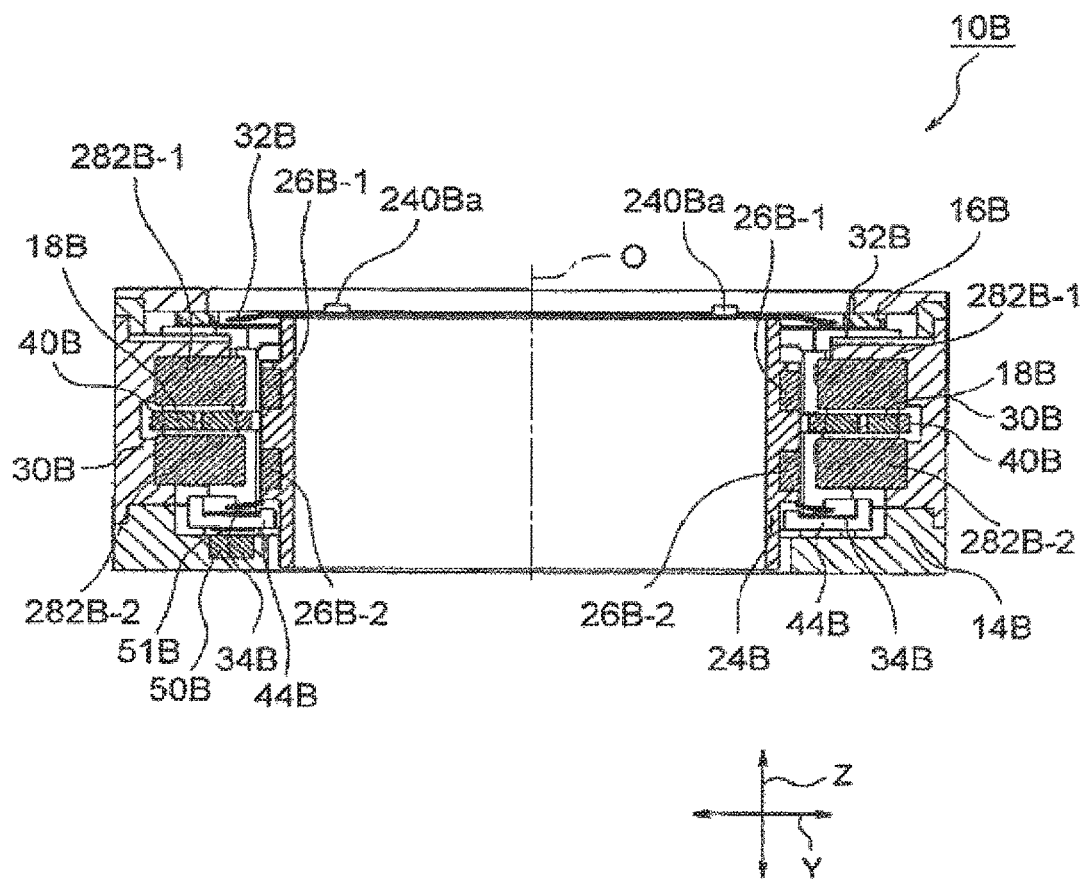
FIG. 13 is a vertical cross-sectional view of the camera-shake correction apparatus shown in FIG. 12.
Figure 14:
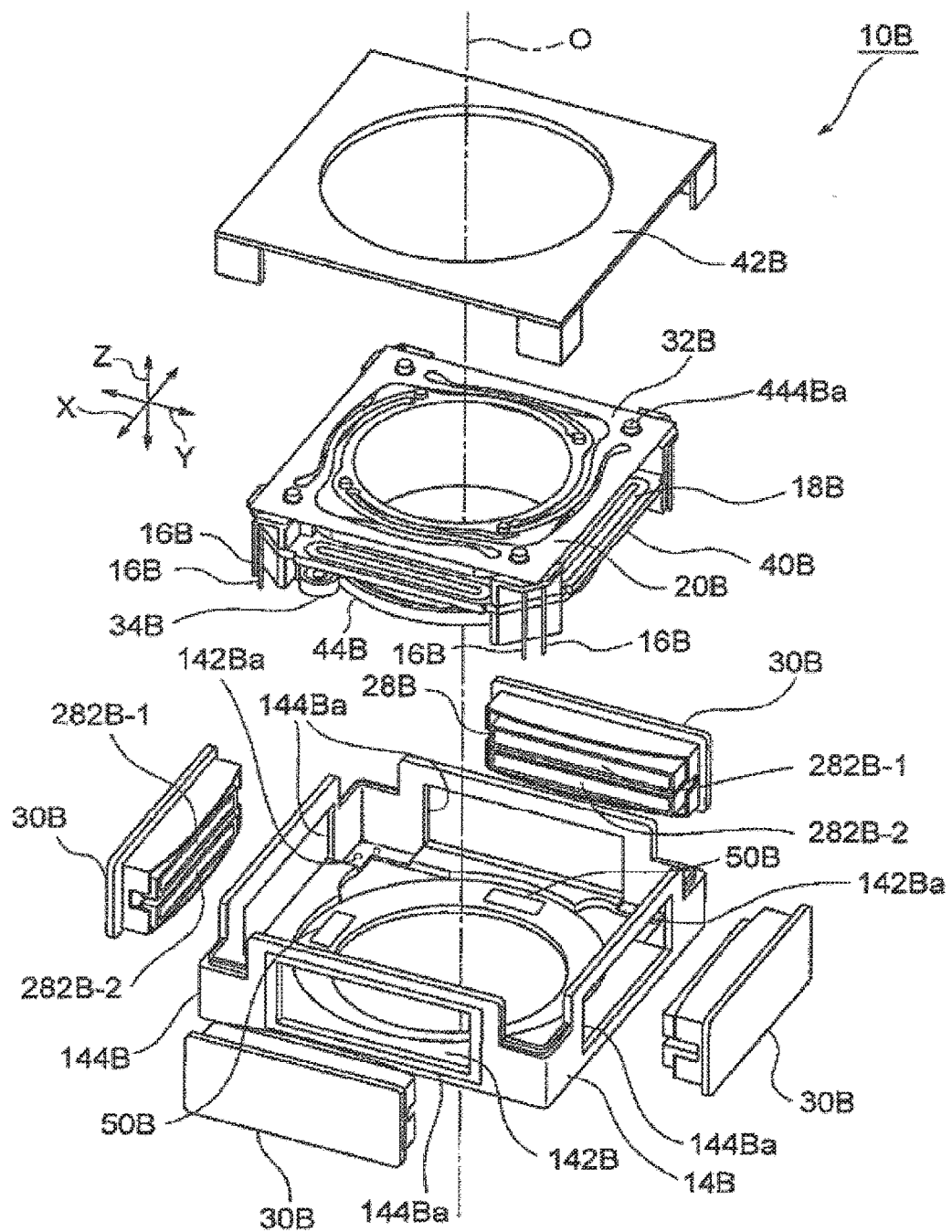
FIG. 14 is an exploded oblique view of the camera-shake correction 17 apparatus shown in FIG. 12.
Figure 15:
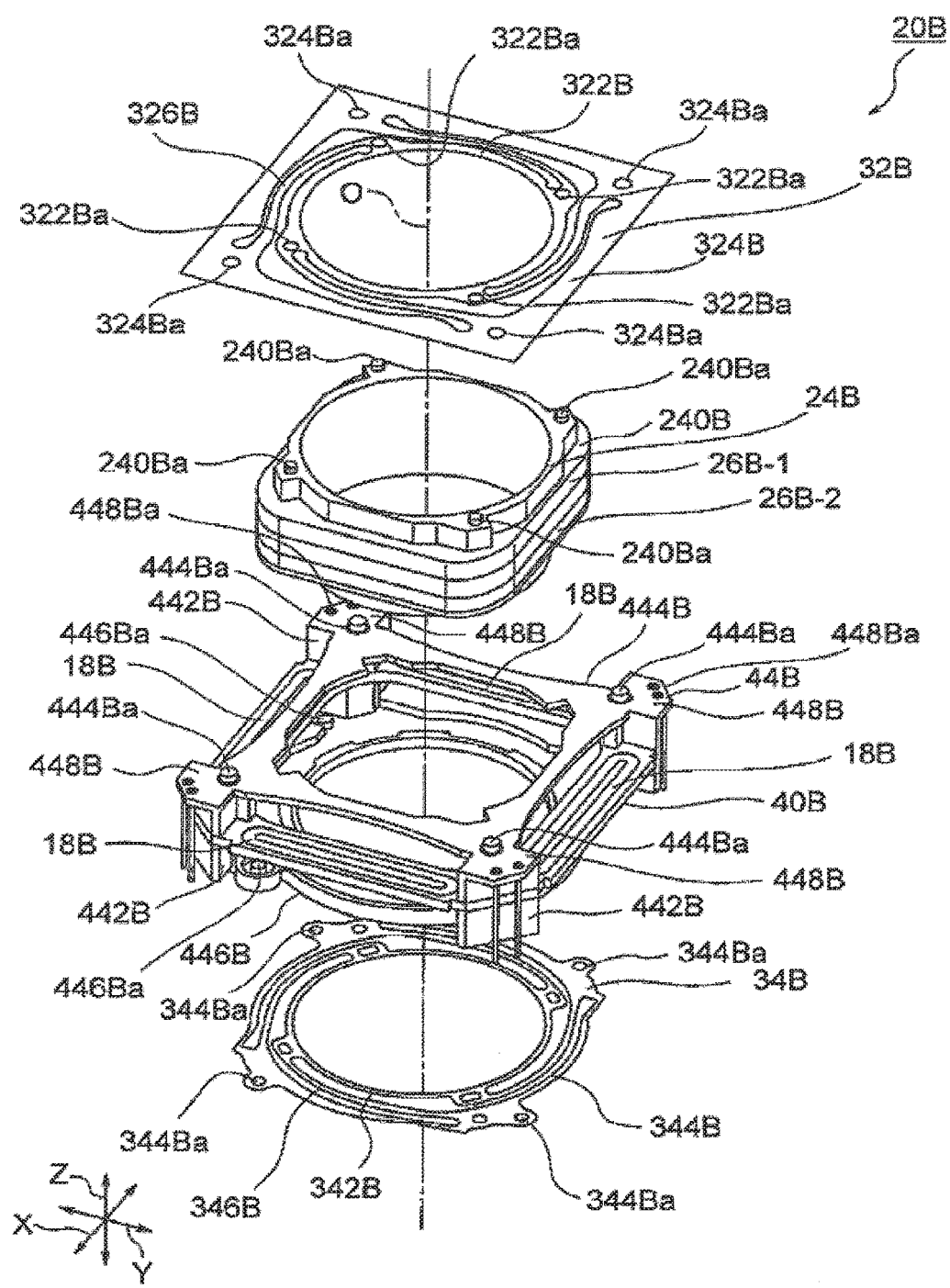
FIG. 15 is an exploded oblique view of a movable section of an auto-focusing lens drive apparatus used in the camera-shake correction apparatus shown in FIG. 12.

Camera-shake correction apparatus 10B according to a third embodiment of the present invention will now be described with reference to FIG. 12 through FIG. 15. FIG. 12 is an external oblique view of camera-shake correction apparatus 10B. FIG. 13 is a vertical cross-sectional view of camera-shake correction apparatus 10B. FIG. 14 is an exploded oblique view of camera-shake correction apparatus 10B. FIG. 15 is an exploded oblique view of auto-focusing lens drive apparatus 20B used in camera-shake correction apparatus 10B shown in FIG. 12.

Here, orthogonal coordinate system (X,Y,Z) is used, as shown in FIG. 12 through FIG. 15. In the states illustrated in FIG. 12 through FIG. 15, in orthogonal coordinate system (X,Y,Z), the X-axis direction is the front-back direction (depth direction), the Y-axis direction is the horizontal direction (width direction), and the Z-axis direction is the vertical-direction (height direction). In the examples shown in FIG. 12 through FIG. 15, vertical direction Z is the lens optical axis O direction. In this third embodiment, the X-axis direction (front-back direction) is also referred to as the first direction, and the Y-axis direction (horizontal direction) is also referred to as the second direction.

In an actual usage situation, the optical axis O direction— that is, the Z-axis direction—is the front-back direction. In other words, the upward Z-axis direction is the forward direction, and the downward Z-axis direction is the rearward direction.

Camera-shake correction apparatus 10B illustrated is an apparatus that corrects camera shake (vibration) that occurs when a still image is captured with a small camera for mobile phone use, and enables a blur-free image to be captured. Camera-shake correction apparatus 10B corrects camera shake by moving a moving part of auto-focusing lens drive apparatus 20B in first direction (front-back direction) X and second direction (horizontal direction) Y that are perpendicular to optical axis O and are perpendicular to each other. Camera-shake correction apparatus 10B illustrated is a camera-shake correction apparatus that uses a "moving coil method."

Auto-focusing lens drive apparatus 20B is for moving a lens barrel (not illustrated) along optical axis O. Base 14B is disposed so as to be spaced from the bottom surface of auto-focusing lens drive apparatus 20B in an outward radial direction. Although not illustrated, an imaging device disposed on an imaging board is mounted on the bottom (rear part) of this base 14B. This imaging device captures a subject image formed by means of the lens barrel, and converts this subject image to an electrical signal. The imaging device comprises, for example, a CCD (charge coupled device) image sensor, CMOS (complementary metal oxide semiconductor) image sensor, or the like. Therefore, a camera module is configured by combining lens drive apparatus 20B, an imaging board, and an imaging device.

Base 14B comprises ring-shaped base section 142B of square external shape and having a circular aperture inside, and square-tube-shaped tubular section 144B having four rectangular apertures 144Ba that projects in the upward optical axis O direction from the outer edge of this base section 142B.

Camera-shake correction apparatus 10B has eight suspension wires 16B, pairs of which each have one end fixed to one of the four corners of base section 142B of base 14B, and camera-shake correction coils 18B disposed so as to face permanent magnet 28B of auto-focusing lens drive apparatus 20B described later herein in a manner described later herein.

Eight suspension wires 16B extend along optical axis O, and support a moving part of auto-focusing lens drive apparatus 20B so as to be able to rock in first direction (front-back direction) X and second direction (horizontal direction) Y. The other ends of eight suspension wires 16B are fixed to the upper end of above auto-focusing lens drive apparatus 20B as described later herein.

As described later herein, camera-shake correction apparatus 10B is provided with one square-ring-shaped coil board 40B disposed so as to face and be spaced from permanent magnet 28B. This coil board 40B is attached to coil holder 44B. Above camera-shake correction coils 18B are formed on this coil board 40B.

Coil holder 44B has four pillar sections 442B extending in parallel to the optical axis O direction at its four corners, approximately square upper ring-shaped end 444B attached to the upper ends (front ends) of these four pillar sections 442B, and lower ring-shaped end 446B attached to the lower ends (rear ends) of four pillar sections 442B. Upper ring-shaped end 444B has four upper projections 444Ba projecting upward at its four corners, and lower ring-shaped end 446B also has four lower projections 446Ba projecting upward.

Auto-focusing lens drive apparatus 20B will now be described with reference to FIG. 14 and FIG. 15.

Auto-focusing lens drive apparatus 20B is provided with lens holder 24B having tubular section 240B for holding a lens barrel, first and second focusing coils 26B-1 and 26B-2 fixed to this lens holder 24B so as to be positioned around tubular section 240B, four magnet holders 30B that hold permanent magnet 28B disposed on the outside of first and second focusing coils 26B-1 and 26B-2, facing first and second focusing coils 26B-1 and 26B-2, and a pair of leaf springs 32B and 34B provided on either side of optical axis O of tubular section 240B of lens holder 24B.

First focusing coil 26B-1 is installed in the upper optical axis O direction of tubular section 240B of lens holder 24B, and second focusing coil 26B-2 is installed in the lower optical axis O direction of tubular section 240B of lens holder 24B.

The pair of leaf springs 32B and 34B support lens holder 24B so as to be displaceable in the optical axis O direction when lens holder 24B is positioned in a radial direction. Of the pair of leaf springs 32B and 34B, leaf spring 32B is referred to as the upper leaf spring, and leaf spring 34B is referred to as the lower leaf spring.

As stated above, in an actual usage situation, the upward Z-axis direction (optical axis O direction) is the forward direction, and the downward Z-axis direction (optical axis O direction) is the rearward direction. Therefore, upper leaf spring 32B is also referred to as the front spring, and lower leaf spring 34B is also referred to as the rear spring.

Four magnet holders 30B are inserted into and fixed in four rectangular apertures 144Ba of tubular section 144B of base 14B. Permanent magnet 28B comprises eight rectangular permanent magnet sections disposed in pairs on four magnet holders 30B so as to be spaced from each other in first direction (front-back direction) X, second direction (horizontal direction) Y, and vertical direction Z. Of these eight rectangular permanent magnet sections, four first permanent magnet sections 282B-1 are disposed in the upper optical axis O direction of four magnet holders 30B, and remaining four second permanent magnet sections 282B-2 are disposed in the lower optical axis O direction of four magnet holders 30B. Four first permanent magnet sections 282B-1 are disposed spaced from first focusing coil 26B-1, and four second permanent magnet sections 282B-2 are disposed spaced from second focusing coil 26B-2.

Upper leaf spring (front spring) 32B is disposed above (forward) in the optical axis O direction in lens holder 24B, and lower leaf spring (rear spring) 34B is disposed below (rearward) in the optical axis O direction in lens holder 24B. Upper leaf spring (front spring) 32B and lower leaf spring (rear spring) 34B have almost identical configurations.

Upper leaf spring (front spring) 32B has upper inner ring section 322A attached to the top of lens holder 24B, and upper outer ring section 324B attached to upper ring-shaped end 444B of coil holder 44B. Four upper arm sections 326B are provided between upper inner ring section 322B and upper outer ring section 324B. That is to say, four upper arm sections 326B link upper inner ring section 322B and upper outer ring section 324B.

Upper outer ring section 324B has four upper holes 324Ba into which four upper projections 444Ba of coil holder 44B are pressed (inserted and attached). That is to say, four upper projections 444Ba of coil holder 44B are pressed into (inserted into and attached inside) four upper holes 324Ba of upper outer ring section 324B of upper leaf spring 32B. On the other hand, tubular section 240B of lens holder 24B has four upper projections 240Ba on its upper end. Upper inner ring section 322B has four upper holes 322Ba into which these four upper projections 240Ba of tubular section 240B are pressed (inserted and attached). That is to say, four upper projections 240Ba of tubular section 240B of lens holder 24B are pressed into (inserted into and attached inside) four upper holes 322Ba of upper inner ring section 322B of upper leaf spring 32B.

Similarly, lower leaf spring (rear spring) 34B has lower inner ring section 342B attached to the bottom of lens holder 24B, and lower outer ring section 344B attached to lower ring-shaped end 446B of coil holder 44B. Four lower arm sections 346B are provided between lower inner ring section 342B and upper outer ring section 344B. That is to say, four lower arm sections 346B link lower inner ring section 342B and lower outer ring section 344B.

Lower outer ring section 344B has four lower holes 344Ba into which four lower projections 446Ba of coil holder 44B are pressed (inserted and attached). That is to say, four lower projections 446Ba of coil holder 44B are pressed into (inserted into and attached inside) four lower holes 344Ba of lower outer ring section 344B of lower leaf spring 34B.

The elastic members comprising upper leaf spring 32B and lower leaf spring 34B function as guide sections that guide lens holder 24B so as to be able to move only in the optical axis O direction. Upper leaf spring 32B and lower leaf spring 34B are made of beryllium copper, phosphor bronze, or the like.

An internal thread (not illustrated) is cut into the inner peripheral wall of tubular section 240B of lens holder 24B, and an external thread (not illustrated) that is screwed into the above internal thread is cut into the outer peripheral wall of the lens barrel. Therefore, to fit the lens barrel into lens holder 24B, the lens barrel is accommodated inside lens holder 24B by turning the lens barrel about optical axis O and screwing the lens barrel into tubular section 240B of lens holder 24B in the optical axis O direction, and they are joined together by means of adhesive or the like.

By passing first and second auto-focusing (AF) currents through first and second focusing coils 26B-1 and 26B-2 respectively, it is possible to adjust the position of lens holder 24B (the lens barrel) in the optical axis O direction through the mutual action of the magnetic field of permanent magnet 28B and magnetic fields by the first and second AF currents flowing through first and second focusing coils 26B-1 and 26B-2.

Camera-shake correction apparatus 10B will now be described in further detail with reference to FIG. 13 and FIG. 14.

As stated earlier, camera-shake correction apparatus 10B has eight suspension wires 16B, pairs of which each have one end fixed to one of the four corners of base section 142B of base 14B, and camera-shake correction coils 188 disposed so as to face permanent magnet 28B of above-described auto-focusing lens drive apparatus 20B.

Consequently, base section 142B has eight wire fixing holes 142Ba, disposed in pairs in its four corners, into each of which one end of one of eight suspension wires 16B is inserted.

Eight suspension wires 16B extend along optical axis O, and support a moving part of auto-focusing lens drive apparatus 20B so as to be able to rock in first direction (front-back direction) X and second direction (horizontal direction) Y. The other ends of eight suspension wires 16B are fixed to the top of above auto-focusing lens drive apparatus 20B.

To be precise, coil holder 44B further has four projecting sections 448B projecting in an outward radial direction at the four corners of upper ring-shaped end 444B (see FIG. 15). Each of four projecting sections 448B has two wire fixing holes 448Ba into which the other ends of two suspension wires 16B are inserted. Therefore, the other ends of eight suspension wires 16B are inserted into these eight wire fixing holes 448Ba, and are fixed with adhesive, solder, or the like.

The reason why the number of suspension wires 16B is eight in this third embodiment is that current is supplied to first and second focusing coils 26B-1 and 26B-2, and camera-shake correction coils 18B, via these eight suspension wires 16B.

As stated above, permanent magnet 28B comprises four first permanent magnet sections 282B-1 and four second permanent magnet sections 282B-2 disposed so as to face each other in first direction (front-back direction) X and second direction (horizontal direction) Y, and so as to be spaced vertically in the optical axis O direction.

Camera-shake correction apparatus 10B is provided with one ring-shaped coil board 40B disposed so as to be inserted between and spaced from four first permanent magnet sections 282B-1 and four second permanent magnet sections 282B-2. Above camera-shake correction coils 18B are formed on this one coil board 40B.

To be precise, four camera-shake correction coils 18B are formed on coil board 40B.

Two camera-shake correction coils 18B disposed so as to face each other in first direction (front-back direction) X are for moving (rocking) a moving part of auto-focusing lens drive apparatus 20B in first direction (front-back direction) X. These two camera-shake correction coils 18B are referred to as the first-direction actuator.

On the other hand, two camera-shake correction coils 18B disposed so as to face each other in second direction (horizontal direction) Y are for moving (rocking) a moving part of auto-focusing lens drive apparatus 20B in second direction (horizontal direction) Y. These two camera-shake correction coils 18B are referred to as the second-direction actuator.

In any event, camera-shake correction coils 18B are for driving a moving part of auto-focusing lens drive apparatus 20B in the X-axis direction (first direction) and Y-axis direction second direction) in collaboration with permanent magnet 28B. Also, the combination of camera-shake correction coils 18B and permanent magnet 28B functions as a voice coil motor (VCM).

Thus, camera-shake correction apparatus 10B illustrated corrects camera shake by moving the lens barrel itself, housed in auto-focusing lens drive apparatus 20B, in first direction (front-back direction) X and second direction (horizontal direction) Y. Therefore, camera-shake correction apparatus 10B is referred to as a "barrel-shifting" camera-shake correction apparatus.

Camera-shake correction apparatus 10B is also provided with cover 42 covering the upper part of auto-focusing lens drive apparatus 20B.

Figure 16:
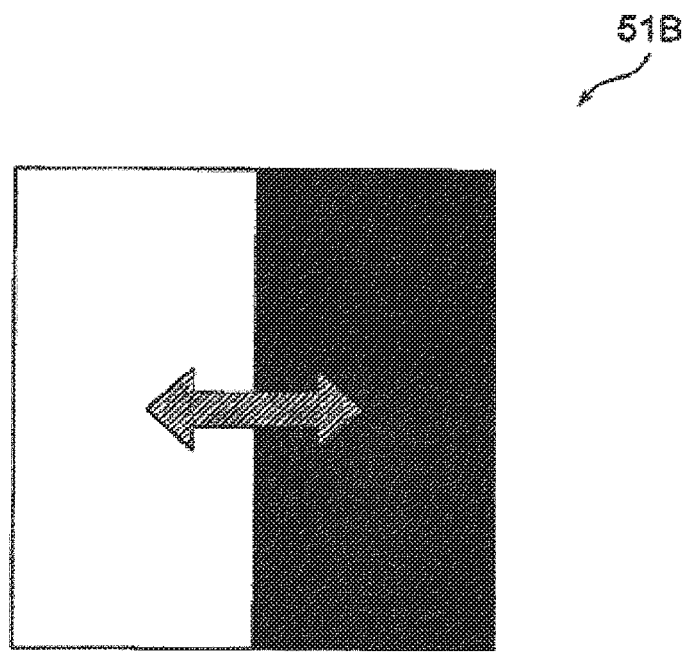
FIG. 16 is a plan view of a position information section of a position detection section used in the camera-shake correction apparatus in FIG. 12.

Also, referring to FIG. 16 in addition to FIG. 13 and FIG. 14, camera-shake correction apparatus 10B is also provided with position detection section (50B, 51B) for detecting the position of a moving part of auto-focusing lens drive apparatus 20B with respect to base 14B.

To be precise, position detection section (50B, 51B) illustrated comprises an optical position detection section. Position detection section (50B, 51B) comprises two position detectors, each of which comprises photoreflector 50B and position information section 51B disposed facing each other. Two position information sections 51B are disposed in first direction X and second direction Y on the underside of lower ring-shaped end 446B of coil holder 44B (in FIG. 13, only one position information section disposed in second direction Y is illustrated).

As shown in FIG. 16, each position information section 51B comprises reflective tape (a reflective seal), and is affixed to the underside of lower ring-shaped end 446B. Reflective tape 51B has a pattern in which a reference position is made a boundary in first direction X or second direction Y, and black and white/light and dark are clearly distinguishable.

On the other hand, two photoreflectors 50B are mounted on base section 142B of base 14B as shown in FIG. 14. Two photoreflectors 50B are disposed spaced from and facing two position information sections 51B.

One photoreflector 50B disposed in first direction (front-back direction) X with respect to optical axis O detects a first position associated with first direction (front-back direction) X movement (rocking) as a voltage level by receiving reflected light from one position information section 51B (detecting the light intensity of the reflected light) by intersecting the light and dark of that position information section 51B facing that photoreflector 50B, as shown by the arrow in FIG. 16. One photoreflector 50B disposed in second direction (horizontal direction) Y with respect to optical axis O detects a second position associated with second direction (horizontal direction) Y movement (rocking) as a voltage level by receiving reflected light from one position information section 51B (detecting the light intensity of the reflected light) by intersecting the light and dark of that position information section 51B facing that photoreflector 50B, as shown by the arrow in FIG. 16.

In camera-shake correction apparatus 10B according to the third embodiment, an optical position detection section that includes two photoreflectors 50B is used as position detection section 50B, but an optical position detection section that includes four photoreflectors may also be used. Also, the position information section 51B pattern is not limited to a black-and-white light-and-dark (binary) pattern, and various kinds of patterns may be used, such as a continuous pattern using gradations, or a continuous pattern using area ratio variation.

In camera-shake correction apparatus 10B having this kind of configuration, operation when the position of lens holder 24B (the lens barrel) is adjusted in the optical axis O direction is similar to that of camera-shake correction apparatus 10A according to the second embodiment described with reference to FIG. 9, and therefore a description thereof is omitted here. Also, operation when a moving part of auto-focusing lens drive apparatus 20B is moved in first direction (front-back direction) X or second direction (horizontal direction) Y is similar to that of camera-shake correction apparatus 10A according to the second embodiment described with reference to FIG. 11, and therefore a description thereof is omitted here.

Camera-shake correction apparatus 10B according to a third embodiment of the present invention as described above achieves the following effects.

Since auto-focusing lens drive apparatus 20B is provided with camera-shake correction apparatus 10B, and permanent magnet 28B is used in common, the number of component parts can be reduced. As a result, the size (mainly the height) of camera-shake correction apparatus 10B can be made smaller (lower).

In an optical unit tilting type of camera-shake correction apparatus, there is a rotation shaft, and consequently friction occurs between a hole and shaft, resulting in the occurrence of hysteresis. In contrast, in camera-shake correction apparatus 10B according to this third embodiment, a moving part of auto-focusing lens drive apparatus 20B is supported mechanically by eight suspension wires 16B, making hysteresis unlikely to occur.

Compared with camera-shake correction apparatuses using conventional optical camera-shake correction methods (lens shifting, sensor shifting, or optical unit tilting), the use of a barrel-shifting method enables the size (mainly the height) of camera-shake correction apparatus 10B to be made virtually the same that of auto-focusing lens drive apparatus 20B. As a result, it is possible for camera-shake correction apparatus 10B according to this third embodiment to be installed in an optical camera-shake correcting camera for mobile phone use.

Also, since camera-shake correction coils 18B are disposed between upper four first permanent magnet sections 282B-1 and lower four second permanent magnet sections 282B-2, it is possible to implement highly sensitive actuators.

Furthermore, since a moving coil method is used, a moving part of auto-focusing lens drive apparatus 20B can be made lighter than when a moving magnet method is used.

To be precise, in "moving-magnet" camera-shake correction apparatus 10A according to the second embodiment, the entirety of auto-focusing lens drive apparatus 20B operates as a moving part. That is to say, as shown in FIG. 8, moving-part component parts comprise lens barrel 12A, lens holder 24A, first and second focusing coils 26A-1 and 26A-2, upper leaf spring 32A, lower leaf spring 34A, permanent magnet 28A, and magnet holder 30A. Consequently, the total weight of moving parts when using a moving magnet method is, for example, 1620 mg.

In contrast, in "moving-coil" camera-shake correction apparatus 10B according to the third embodiment, as shown in FIG. 15, moving-part component parts comprise the lens barrel, lens holder 24B, first and second focusing coils 26B-1 and 26B-2, camera-shake correction coils 18B, and coil holder 44B. Consequently, the total weight of moving parts when using a moving coil method is, for example, 765 mg.

Since the weight of moving parts can be reduced in this way, an offset correction current value can be improved, and as a result, the thrust of moving parts can be increased.

In the above-described third embodiment, permanent magnet 28B comprises four first permanent magnet sections 282B-1 and four second permanent magnet sections 282B-2 disposed so as to face each other in first direction X and second direction Y, and to be spaced vertically in the optical axis O direction, but the number of first permanent magnet sections and second permanent magnet sections is not limited to four each, and, for example, eight sections may be used that are disposed facing in diagonal directions rather than in only a first and second direction. In this case, the number of camera-shake correction coils 18B is also changed to eight. Also, in the above-described third embodiment, eight suspension wires 16B rise up in pairs from the four corners of base section 142B of base 14B, but these ends may also rise up in pairs from the outer periphery of base section 142B. Furthermore, the number of suspension wires 16B is not limited to eight, and may be any plurality.

Figure 17:
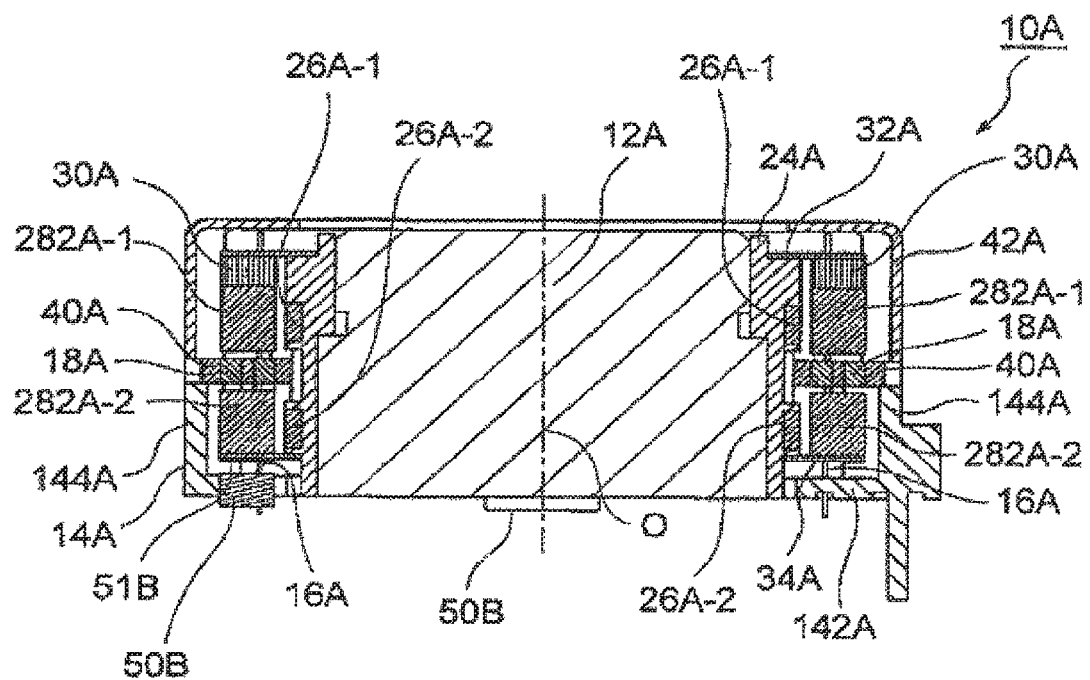
FIG. 17 is a vertical cross-sectional view of a sample variant using an optical position detection section as a position detection section in the camera-shake correction apparatus shown in FIG. 6.

FIG. 17 is a vertical cross-sectional view of a sample variant in which the optical position detection section used in camera-shake correction apparatus 10B according to the above-described third embodiment is used as a position detection section in camera-shake correction apparatus 10A according to the above-described second embodiment.

In this sample variant, two photoreflectors 50B are provided instead of two Hall devices 50A, in the positions in which two Hall devices 50A were disposed. That is to say, these two photoreflectors 50B are disposed spaced from and facing two of four second permanent magnet sections 282A-2. Two position information sections (pieces of reflective tape) 51B are affixed to a moving part (auto-focusing lens drive apparatus 20A) facing these two photoreflectors 50B. In the example illustrated, two position information sections (pieces of reflective tape) 51B are provided on (affixed to) the underside of tower leaf spring 34A.

A position detection operation by this optical position detection section is similar to that of the third embodiment described earlier, and therefore a description thereof will be omitted here in order to simplify the explanation.

Although not illustrated, an above-described optical position detection section may of course also be used instead of a magnetic position detection section in camera-shake correction apparatus 10 according to the above-described first embodiment.

A typical aspect of the present invention is described below.

In a camera-shake correction apparatus according to a typical aspect of the present invention described above, an auto-focusing lens drive apparatus may be provided with: a lens holder that has a tubular section for holding a lens barrel, and that fixes a focusing coil so as to be positioned around the tubular section; a magnet holder that is disposed on the outer periphery of this lens holder and holds a permanent magnet; and a pair of leaf springs that support the lens holder so as to be displaceable in the optical axis direction when positioned in a radial direction.

According to a camera-shake correction apparatus according to a first aspect of the present invention, an auto-focusing lens drive apparatus may have an upper board mounted on the upper end of a magnet holder. In this case, other ends of a plurality of suspension wires are fixed to the upper board. Also, a pair of leaf springs may be fixed in linked fashion between the lens holder and magnet holder. The permanent magnet may include a plurality of permanent magnet sections disposed so as to face each other in a first direction and second direction. In this case, a camera-shake correction coil is disposed on the outside of the plurality of permanent magnet sections, the camera-shake correction apparatus may be provided with a plurality of coil boards that are disposed so as to face and be spaced from the plurality of permanent magnet sections, and on which a camera-shake correction coil is formed. The camera-shake correction apparatus may also include a shield cover that covers the plurality of coil boards. in this case, the plurality of coil boards may be attached to the inner wall of the shield cover. It is desirable for the camera-shake correction apparatus to have a position detection section for detecting the position of the auto-focusing lens drive apparatus with respect to a base. The position detection section may comprise, for example, a Hall device that is disposed so as to be spaced from and face the permanent magnet sections, and is mounted on the base.

According to a camera-shake correction apparatus according to another aspect of the present invention, a permanent magnet may comprise a plurality of first permanent magnet sections and a plurality of second permanent magnet sections that are disposed so as to face each other in a first direction and second direction, and that are disposed so as to be spaced from each other in the optical axis direction. The first permanent magnet sections and second permanent magnet sections are polarized into an N pole and S pole in a radial direction, and the first permanent magnet sections and second permanent magnet sections have magnetic poles that differ in the optical axis direction. Focusing coils comprise a first and second focusing coil that are fixed so as to be positioned around a tubular section of a lens holder, facing the plurality of first permanent magnet sections and the plurality of second permanent magnet sections respectively. A camera-shake correction coil comprises a plurality of camera-shake correction coils that are disposed inserted between the plurality of first permanent magnet sections and four second permanent magnet sections. The camera-shake correction apparatus is provided with a ring-shaped coil board on which a plurality of camera-shake correction coils are formed.

According to a camera-shake correction apparatus according to a second aspect of the present invention, a base may comprise a ring-shaped base section and a tubular section extending in an upward optical axis direction from the outer edge of this base section. In this case, a coil board is fixed to the upper end of the tubular section of the base, and a pair of leaf springs are fixed in linked fashion between a lens holder and magnet holder. Also, a plurality of suspension wires may rise up from the outer peripheral section of the base section. In this case, the magnet holder is provided with an upper ring-shaped end section, this upper ring-shaped end section may have a plurality of wire insertion holes into which the other ends of the plurality of suspension wires are inserted, and of the pair of leaf springs, the upper leaf spring in the upper optical axis direction may have a plurality of wire fixing holes into which the other ends of the plurality of suspension wires are inserted. The coil board may have a plurality of through-holes through which the plurality of suspension wires pass. It is desirable for the camera-shake correction apparatus to have a position detection section for detecting the position of an auto-focusing lens drive apparatus with respect to the base. The position detection section may comprise, for example, two Hall devices that are disposed so as to be spaced from and face at least two second permanent magnet sections that are disposed in a first direction and second direction among a plurality of second permanent magnet sections, and that are mounted on the base section. Instead of this, the position detection section may comprise at least two photoreflectors and at least two position information sections, disposed so as to face each other. In this case, at least two position information sections are disposed in the first direction and second direction on the underside of the lower leaf spring positioned in a lower optical axis direction among the pair of leaf springs, and at least two photoreflectors are mounted on the base section, disposed so as to be spaced from and face at least two position information sections respectively.

According to a camera-shake correction apparatus according to a third aspect of the present invention, the camera-shake correction apparatus is further provided with a coil holder that holds a coil board, and a base may comprise a ring-shaped base section and a tubular section having a plurality of apertures extending in an upward optical axis direction from the outer edge of this base section. In this case, a magnet holder comprises a plurality of magnet holders that hold one first permanent magnet section and one second permanent magnet section respectively. The plurality of magnet holders are fixedly inserted into a plurality of apertures of the tubular section of the base, and a pair of leaf springs are fixed in linked fashion between a lens holder and the coil holder. Also, a plurality of suspension wires may rise up from the outer peripheral section of the base section. In this case, the coil holder is provided with an upper ring-shaped end section and a plurality of projecting sections that project in an outward radial direction from the outer peripheral section of this upper ring-shaped end section, and this plurality of projecting sections may have a plurality of wire fixing holes into which the other ends of the plurality of suspension wires are inserted. It is desirable for the camera-shake correction apparatus to have a position detection section for detecting the position of a moving part of an auto-focusing lens drive apparatus with respect to the base. The coil holder is further provided with a lower ring-shaped end section, and the above position detection section may comprise at least two photoreflectors and at least two position information sections, disposed so as to face each other. In this case, at least two position information sections are disposed in a first direction and second direction on the underside of the lower ring-shaped end section of the coil holder, and at least two photoreflectors are mounted on the base section, disposed so as to be spaced from and face at least two position information sections respectively.

The present invention has been described above with particular reference to embodiments thereof, but the present invention is not limited to these embodiments. It is understood that various variations and modifications in form and detail may be possible by those skilled in the art without departing from the spirit and scope of the present invention stipulated in the claims. For example, in the above embodiments, a magnetic position detection section comprising Hall devices or an optical position detection section that includes photoreflectors is used as a position detection section (position sensor), but another position detection section (position sensor) may also be used.

This application is entitled to and claims the benefit of Japanese Patent Application No. 2009-191619, filed on Aug. 21, 2009, and Japanese Patent Application No. 2010-158602, filed on Jul. 13, 2010, the disclosures of which including the specifications, drawings and abstracts are incorporated herein by reference in their entirety.

What is claimed is:

1. A lens drive apparatus for use in a small camera module, which displaces a lens holder in a direction of an optical axis and a direction orthogonal to the optical axis in collaboration with a magnet and a coil, the lens drive apparatus comprising:
  an assembly that is formed by assembling the lens holder together with a conductive body and comprises a circuit that receives supplied power;
  a base that is disposed at a position spaced from the assembly and has an aperture through which the optical axis passes;
  a plurality of suspension wires that are disposed around the aperture and support the assembly such that the assembly is displaceable in the direction orthogonal to the optical axis;
  a shake correction drive section configured to displace the assembly by a shake correction magnet and a shake correction coil disposed at a position facing the shake correction magnet in collaboration with each other; and
  a position detection section configured to detect a position of the assembly in the direction orthogonal to the optical axis, wherein:

the plurality of suspension wires include a first suspension wire configured to supply power to the circuit, and a second suspension wire configured to supply power to the circuit via a path different from that of the first suspension wire, the shake correction magnet is disposed around the lens holder, and the shake correction magnet, the shake correction coil and the position detection section are disposed at respective positions shifted in the direction of the optical axis with respect to each other, the circuit includes a focusing coil and the shake correction coil, the first suspension wire supplies power to the focusing coil, and the second suspension wire supplies power to the shake correction coil.

2. The lens drive apparatus for use in a small camera module according to claim 1, wherein:

the assembly includes:
a voice coil motor (VCM) holder that holds the shake correction magnet or the shake correction coil; and
a leaf spring that is attached to the VCM holder and supports the lens holder such that the lens holder is displaceable in the direction of the optical axis.

3. The lens drive apparatus for use in a small camera module according to claim 1, wherein, in each of the plurality of suspension wires, a first end is fixed to the base and a second end is fixed to the assembly.

4. The lens drive apparatus for use in a small camera module according to claim 3, wherein the base to which the first end of each of the plurality of suspension wires is fixed is disposed at a position spaced from the assembly to which the second end of each of the plurality of suspension wires is fixed, in the direction of the optical axis.

5. The lens drive apparatus for use in a small camera module according to claim 1, wherein the aperture is an aperture through which the optical axis passes in a displacement range of the optical axis resulting from displacement of the assembly in the direction orthogonal to the optical axis.

6. The lens drive apparatus for use in a small camera module according to claim 1, further comprising:
a focusing drive section configured to displace the lens holder by a focusing magnet and a focusing coil in collaboration with each other,
wherein:
the focusing magnet doubles as the shake correction magnet.

7. A small camera module comprising:
the lens drive apparatus for use in a small camera module according to claim 1; and
an imaging device that captures a subject image formed by means of a lens section held by the lens holder.

8. A camera comprising:
the small camera module according to claim 7; and
a control section that controls the small camera module.

* * * * *